US011506057B2

(12) United States Patent
Hellwig

(10) Patent No.: US 11,506,057 B2
(45) Date of Patent: Nov. 22, 2022

(54) TESLA-TYPE TURBINE, METHOD FOR OPERATING A TESLA-TYPE TURBINE, APPARATUS FOR CONVERTING THERMAL ENERGY INTO MECHANICAL ENERGY, METHOD FOR CONVERTING THERMAL ENERGY INTO MECHANICAL ENERGY AND METHOD FOR CONVERTING THERMAL ENERGY INTO ELECTRICAL ENERGY

(71) Applicant: Udo Hellwig, Berlin (DE)

(72) Inventor: Udo Hellwig, Berlin (DE)

(73) Assignee: Udo Hellwig, Berlin (DE)

( * ) Notice: Subject to any disclaimer, the term of this patent is extended or adjusted under 35 U.S.C. 154(b) by 0 days.

(21) Appl. No.: 17/137,182

(22) Filed: Dec. 29, 2020

(65) Prior Publication Data
US 2021/0115815 A1   Apr. 22, 2021

Related U.S. Application Data

(63) Continuation of application No. PCT/EP2019/067570, filed on Jul. 1, 2019.

(30) Foreign Application Priority Data

Jun. 29, 2018   (DE) .................... 10 2018 115 888.2

(51) Int. Cl.
*F01D 1/36*   (2006.01)
*F01D 5/08*   (2006.01)
*F01K 7/16*   (2006.01)

(52) U.S. Cl.
CPC ................. *F01D 1/36* (2013.01); *F01D 5/08* (2013.01); *F01K 7/16* (2013.01); *F01D 5/088* (2013.01);
(Continued)

(58) Field of Classification Search
CPC ... F01D 1/36; F01D 5/08; F01D 5/085; F01D 5/087; F01D 5/088; F01D 5/181;
(Continued)

(56) References Cited

U.S. PATENT DOCUMENTS 3,045,428 A * 7/1962 McLean .................... F02C 3/04
60/805
3,899,875 A   8/1975 Oklejas et al.
(Continued)

OTHER PUBLICATIONS

International Search Report dated Oct. 21, 2019 in corresponding application PCT/EP2019/067570.

*Primary Examiner* — Mark A Laurenzi
*Assistant Examiner* — Xiaoting Hu
(74) *Attorney, Agent, or Firm* — Muncy, Geissler, Olds & Lowe, P.C.

(57) ABSTRACT

A tesla-type turbine for converting the enthalpy of a gas volume flow into mechanical energy, a method for operating the Tesla-type turbine, and an apparatus for converting thermal energy into mechanical energy, a method for converting thermal energy into mechanical energy, and a method for converting thermal energy into electrical energy. The Tesla-type turbine has at least one disc which is positioned on an axis of rotation and is set into rotation by a gas volume flow flowing substantially tangentially, so that mechanical energy can be collected at a shaft coupled to the disc. A disc body that forms the disc has at least one cavity in which, for the purpose of cooling the disc body, a cooling medium, in particular a cooling liquid, is received or can be received.

11 Claims, 6 Drawing Sheets

(52) U.S. Cl.
CPC ...... *F05D 2220/30* (2013.01); *F05D 2220/60* (2013.01); *F05D 2260/20* (2013.01); *F05D 2260/207* (2013.01)

(58) Field of Classification Search
CPC ................. F01D 25/12; F05D 2260/20; F05D 2260/205; F05D 2260/207; F05D 2220/30; F05D 2220/60; F01K 7/16; F03G 7/00; F02C 1/10; F02C 7/16
See application file for complete search history.

(56) References Cited

U.S. PATENT DOCUMENTS

| | | | |
|---|---|---|---|
| 6,973,792 B2 * | 12/2005 | Hicks | B82Y 30/00 60/805 |
| 2002/0182054 A1 | 12/2002 | Entrican, Jr. | |
| 2009/0260361 A1 * | 10/2009 | Prueitt | F01K 27/00 60/670 |
| 2014/0102115 A1 * | 4/2014 | Tepic | F01D 1/34 60/805 |
| 2014/0271120 A1 * | 9/2014 | Cochran | F01D 5/088 415/1 |
| 2015/0330234 A1 | 11/2015 | Ryker et al. | |

\* cited by examiner

TESLA-TYPE TURBINE, METHOD FOR OPERATING A TESLA-TYPE TURBINE, APPARATUS FOR CONVERTING THERMAL ENERGY INTO MECHANICAL ENERGY, METHOD FOR CONVERTING THERMAL ENERGY INTO MECHANICAL ENERGY AND METHOD FOR CONVERTING THERMAL ENERGY INTO ELECTRICAL ENERGY

This nonprovisional application is a continuation of International Application No. PCT/EP2019/067570, which was filed on Jul. 1, 2019, and which claims priority to German Patent Application No. 10 2018 115 888.2, which was filed in Germany on Jun. 29, 2018, and which are both herein incorporated by reference.

BACKGROUND OF THE INVENTION

Field of the Invention

The present invention relates to a Tesla-type turbine for converting the enthalpy of a gas volume flow into mechanical energy, and to a method for operating the Tesla-type turbine according to the invention. The invention further relates to an apparatus for converting thermal energy into mechanical energy, a method for converting thermal energy into mechanical energy and a method for converting thermal energy into electrical energy.

Description of the Background Art

Gas turbines are limited by the material of the force-absorbing elements of the rotor. This can be compensated for by cooling these elements internally, by passing cooling medium through them and allowing it to flow with the working medium, or by a conservative cooling process in which the cooling medium is retained. The former is prior art, using water vapor or air as cooling media. The latter is also prior art, but with the limitation that the cooling medium, preferably water, is supplied to the blades via the rotor shaft and evaporates in the blades.

SUMMARY OF THE INVENTION

It is therefore an object of the present invention to provide a Tesla-type turbine and a method for operating a Tesla-type turbine, an apparatus for converting thermal energy into mechanical energy and a method for converting thermal energy into mechanical energy as well as a method for converting thermal energy into electrical energy, which enable the conversion of thermal energy into mechanical and/or electrical energy in an efficient manner.

A first aspect of the invention is a Tesla-type turbine for converting the enthalpy of a gas volume flow into mechanical energy, comprising at least one disc arranged on an axis of rotation, which disc is rotatable with a gas volume flow at a substantially tangential inflow, so that mechanical energy is removable at a shaft coupled to the disc. A disc body forming the disc has at least one cavity in which a cooling medium, in particular a cooling liquid, is or can be received for the purpose of cooling the disc body. Furthermore, the Tesla-type turbine has at least one gas receiving chamber for receiving and discharging the gas volume flow flowing at least partially tangentially relative to the disc.

In other words, the Tesla-type turbine according to the invention is a Tesla-type turbine having at least one, preferably a plurality of disc or discs arranged about an axis of rotation, which disc or discs can be set into rotation with a gas volume flow flowing substantially tangentially against them, so that mechanical energy can be collected at a shaft coupled to the disc, the disc or discs having, in the disc body forming a respective disc, at least one cavity in which a coolant is or can be received for the purpose of cooling the disc body, and the Tesla-type turbine further having a gas receiving chamber for receiving and discharging an at least partially tangential gas volume flow relative to the disc or discs.

Tangential inflow can mean an inflow to the disc or discs in a radially outer region of the disc in an inflow direction substantially transverse to the axis of rotation. Preferably, the flow is tangential against the circumferential surface of the disc or discs.

The disc or discs are arranged on an axis of rotation. The tangential inflow causes the disc to rotate, in other words to rotate about the axis of rotation. Further, the disc is coupled to a shaft by means of which the mechanical energy of rotation is removable. The disc or discs can be arranged on the shaft in a rotationally fixed manner.

The disc has a substantially round shape in at least one plane, in particular a plane to which the axis of rotation of the disc is perpendicular. However, it is also possible to deviate from this round shape, for example in such a way that the discs have a blade shape. In other words, instead of discs, blade elements can also be used, such as are known from a radial turbine.

The gas that flows relative to the disc or discs is also referred to as the working medium. This can be, for example, a flue gas from a combustion plant or, alternatively, a working medium that is heated by means of a heat exchanger device. In the latter case, the working medium is advantageously a noble gas, in particular xenon. Noble gases are useful because they are not able to radiate, since they are monatomic. The radiation of the gas body would lead to an increased heat transfer, which entails the risk that the gas body between the discs of the turbine would cool down too quickly and thus not be able to deliver any work to the discs, or only to a very small extent.

A disc is formed by a disc body. A disc body of a disc, in particular of each disc, has at least one cavity. It is not excluded that a disc has several cavities. In particular, the cavity extends from a radially inner region of the disc into a radially outer region of the disc.

A cooling medium is received or can be received in the cavity of the disc. In particular, the cooling medium is a cooling liquid, meaning that the cooling medium is in the liquid phase at ambient conditions. For example, the cooling medium is water. Organic or inorganic fluids and metals can be used as cooling media.

The Tesla-type turbine according to the invention has a gas receiving chamber. The gas, which flows tangentially relative to the disc or discs, is introduced into the receiving chamber by an inlet device, received therein and discharged by an outlet device. In other words, the gas receiving chamber is adapted to allow the gas to flow into and out of it, thus having an inlet and an outlet, the inlet preferably being arranged in a region remote from the axis of rotation of the discs and the outlet being arranged in a region close to the axis. The discs, preferably all discs, of the Tesla-type turbine are arranged within the gas receiving chamber.

In an example of the Tesla-type turbine according to the invention, the disc is adapted to at least partially evaporate cooling medium received in its cavity when heat is supplied from the gas volume flow flowing relative to the disc to the disc in the cavity.

In other words, the disc is adapted to absorb heat from the gas volume flow flowing against or about the disc and to release it to the cooling medium in the cavity of the disc, so that the cooling medium at least partially evaporates inside the disc body.

In the case of a plurality of discs, at least one of the discs can be adapted to evaporate coolant received in its cavity when heat is supplied from the circulating gas volume flow in the cavity. In principle, it is also possible that at least one of the discs is adapted to heat coolant received in its cavity in the cavity when heat is supplied from the circulating gas volume flow substantially without vaporization.

The vapor of the cooling medium can be returned to the shaft, in particular the shaft of the rotor, and is preferably expanded in a force-dissipating manner, condensed and returned to the discs or the blades. In this case, the cooling medium is led out of the cavity for condensation and, after condensation, is returned into the cavity.

However, the cooling medium condensed in this way can also be used in a different way in that it does not leave the force-absorbing elements of the rotor at all, i.e. the discs or the blades, but is evaporated and condensed quasi in situ. This process is similar to that in so-called "heat pipes." The easiest way to realize this is with rotating discs of a Tesla-type turbine similar to a Tesla turbine, the necessary condition being that the discs are hollow, in other words have a cavity, and contain a cooling medium. As the discs rotate, the cooling medium is pushed radially outward to the disc outer edge, where it is vaporized by hot gas in the vicinity of the disc. The vapor of the cooling medium has a much lower density than the liquid phase of the cooling medium, so it can always be displaced by the liquid phase. This accommodates the fact that the heat flow densities at the radially outer edge of the disc are particularly high, but the liquid phase is able to absorb high heat flow densities without forming vapor cushions.

For continuity reasons, the vapor is directed to the central area of the disc, i.e. radially inwards, where it condenses, since the gas, which may be a flue gas, for example, is colder in the vicinity of the axis of rotation or the shaft. The heat flows are advantageously adjusted or adjustable via the boiling temperature, the liquid quantity and the gas temperatures so that the absorbing heat flow is equal to the emitting heat flow. Due to the heat dissipation in the outer area of the disc, the gas is not able to do any work on the disc, or only to a very limited extent. This means that in this area, heat is mainly transferred to the cooling medium inside the disc body. In the central, i.e. radially inner, area of the disc, the heat is transferred back to the gas, which, however, is associated with an equivalent amount of work. This means that the gas transmits approximately isothermal force to the disc.

The discs of the Tesla-type turbine according to the invention are designed in such a way that they have an internal fluid circuit or cooling medium circuit in the cavity, so that evaporation occurs in the outer area and condensation in the central, i.e. radially inner area, as a result of external heat supply through and heat dissipation to a surrounding gas, preferably a hot flue gas, which is used as a working medium for the generation of mechanical energy.

The disc body is typically, but not necessarily, substantially made of a metal. The strength of metals is in principle dependent on temperature and decreases progressively with increasing working temperature, in particular with increasing temperature of the gas volume flow, of the Tesla-type turbine. This means that by cooling the discs of the Tesla-type turbine according to the invention, the turbine can be operated at a higher working temperature and the work input can be increased. With cooled discs, it is therefore possible to provide lightweight materials with low strength for the design of the disc body without the risk of breakage. At the same time, the designs of Tesla-type turbines in particular become much more compact.

The effect of the Tesla-type turbine according to the invention is that, due to the cooling of the disc, it is subjected to a relatively low thermal load, so that a variety of materials can be used to form the respective disc body, including materials that have a low density and consequently a low weight. In particular, discs made of materials with very low density can be set into rotation at a very high speed due to their resulting low mass moment of inertia, so that the turbine can be operated at high speed and consequently with high efficiency.

The Tesla-type turbine may comprise a plurality of discs which are arranged on an axis of rotation, the disc bodies of mutually adjacent discs being mechanically connected to one another by means of connecting elements. For this purpose, the disc bodies may, for example, comprise at least one recess or sleeve which is adapted for mechanical connection of at least one adjacent disc. In other words, the disc bodies are combined with each other by means of sleeves that allow external fastening.

Advantageously, spacer elements are arranged between two adjacent discs to ensure a defined distance. The spacer elements are arranged mechanically, preferably in the radially outer area of the discs. In this way, a disc pack is realized.

A second aspect of the invention is a method for operating a Tesla-type turbine according to the invention for converting the enthalpy of a gas volume flow into mechanical energy, wherein a gas volume flow is supplied to the disc substantially tangentially flowing relative to the disc, so that the disc is set in rotation due to friction.

Advantageously, a plurality of discs of a Tesla-type turbine are set in rotation by friction.

In an example of the method for operating the Tesla-type turbine according to the invention, heat from the gas volume flow is transferred to the cooling medium in the cavity of the disc body, so that the cooling medium at least partially evaporates.

In an example of the method for operating the Tesla-type turbine according to the invention, heat of the gas volume flow is transferred to the cooling medium in the cavity of the disc body, so that the temperature of the cooling medium is increased, the cooling medium remaining present substantially in liquid phase.

A third aspect of the invention is an apparatus for converting thermal energy into mechanical energy comprising a Tesla-type turbine according to the invention, wherein the disc of the Tesla-type turbine is arranged coaxially on a shaft. The shaft is mechanically connected to a compressor unit, which has at least one compressor disc connected to the shaft in a rotationally fixed manner, so that the compressor disc can be set into rotation when the Tesla-type turbine rotates. Furthermore, the compression unit comprises a compressor gas receiving chamber, which is fluidically connected to the gas receiving chamber of the Tesla-type turbine, so that gas compressed by the compression unit can be supplied to the Tesla-type turbine, in particular to the gas receiving chamber of the Tesla-type turbine.

In other words, the apparatus for converting thermal energy into mechanical energy comprises a Tesla-type turbine according to the invention, wherein the disc(s) is/are arranged coaxially on a shaft, and wherein the shaft is mechanically connected to a compression unit comprising one or more compressor discs which is/are connected to the shaft in a rotationally fixed manner, such that upon rotation of the Tesla-type turbine the compressor disc(s) are caused to rotate; and wherein the compression unit comprises a compressor gas receiving chamber fluidically connected to the gas receiving chamber of the Tesla-type turbine, such that gas compressed by the compression unit can be supplied to the Tesla-type turbine.

Preferably, the Tesla-type turbine of the apparatus according to the invention comprises several discs which are arranged coaxially on a common shaft. The gas volume flow, which flows tangentially relative to the discs, can put them into a rotational movement. Due to the rotationally fixed connection of the compressor disc or discs of the compressor unit, the rotational movement can be transmitted to the same. In other words, the compressor disc is also set into rotation.

The compressor discs are arranged in a compressor gas receiving chamber. This compressor gas receiving chamber is connected fluidically to the gas receiving chamber of the Tesla-type turbine. In other words, a gas exchange between the compressor gas receiving chamber and the gas receiving chamber can be realized.

Both discs and compressor discs can be arranged within a housing, but separated at least in sections via a separating element.

The compressor unit compresses gas. In other words, the pressure of a gas is increased in the compressor unit, typically also increasing the temperature of the gas. Via the fluidic connection between the compressor gas receiving chamber and the gas receiving chamber, the compressed gas can be supplied to the gas receiving chamber and thus to the discs of the Tesla-type turbine for the purpose of performing work on the discs or the disc, whereby the gas is expanded in the Tesla-type turbine.

Furthermore, expanded gas can advantageously be supplied from the Tesla-type turbine to the compressor unit by means of a further fluidic connection, so that a closed gas circuit between the Tesla-type turbine and the compressor unit can be realized. A closed gas circuit of the working medium is advantageous, for example, in the case of using noble gases as working medium.

The compressor unit of the apparatus for converting thermal energy into mechanical energy according to the invention can also be referred to as a rotary compressor. The rotary compressor takes up the working medium expanded in the Tesla-type turbine, in other words the expanded gas volume flow, preferably in a region close to the shaft. For this purpose, the rotary compressor is preferably arranged directly next to the flash tank, i.e. the Tesla-type turbine. The compressed working medium can leave the compressor via tangentially oriented openings at the end of the two eccentric headers and is fed to a combustion chamber to be heated up again here, preferably by means of a heat exchanger device.

In an example of the apparatus for converting thermal energy into mechanical energy according to the invention, the compressor disc has at least one cavity in a disc body forming the compressor disc, the cavity of at least one disc of the Tesla-type turbine being fluidically connected to the cavity of at least one compressor disc, so that cooling medium present at least partially in gaseous phase can be fed from the cavity of the disc of the Tesla-type turbine to the cavity of the compressor disc.

This means that the compressor disc or compressor discs likewise have a cavity in the respective disc body, the cavity of the disc of the Tesla-type turbine being fluidically connected to the cavity of the compressor disc, so that coolant present in gaseous phase can be fed from the cavity of the disc to the cavity of the compressor disc.

In other words, the cooling medium present at least partially in a gaseous phase, which has been at least partially vaporized by supplying heat from the gas volume flow to the disc of the Tesla-type turbine, can be supplied to a cavity formed by the disc body of the compressor disc by means of a fluidic connection between the cavity of the disc and the cavity of the compressor disc.

In principle, several discs of the Tesla-type turbine can be connected to a plurality of the compressor discs of the compressor unit.

Preferably, the fluidic connection between the cavities of the disc and the compressor disc is formed in an area close to the shaft so that the cooling medium, which is preferably present in the gaseous phase in the radially inner area of the cavity of the disc, can flow into the cavity of the compressor disc.

A second fluidic connection between the cavities of the disc and the compressor disc can be formed in a radially outer region, so that the condensed cooling medium can flow from the cavity of the compressor disc into the cavity of the disc via this fluidic connection. In this way, a closed cooling medium circuit is formed between the compressor unit and the Tesla-type turbine or its discs.

In contrast to the expansion of the gas volume flow in the Tesla-type turbine according to the invention, in which the temperature of the working medium, i.e. the gas, constantly decreases, particularly in the isentropic case, the temperature constantly increases in the compressor unit during compression, particularly isentropic compression. During expansion in the Tesla-type turbine according to the invention, the heat is distributed within the disc in such a way that the heat dissipated in the radially outer region of the disc, i.e. in a region remote from the shaft, is returned to the radially inner region, i.e. near the shaft, to substantially the same extent. The transition region between the radially outer and radially inner regions of the disc, also referred to as the residual region of the disc located in the region close to the shaft, enables substantially isentropic expansion.

During compression in the compressor unit, the above principle of heat distribution is reversed in such a way that heat would be dissipated in the radially inner region of the disc, i.e. in the cavity of the compressor disc, and heat is returned to the working medium to substantially the same extent in the upper or radially outer region of the compressor disc.

The compressor disc can be connected to a rotatable cooling unit in a rotationally fixed manner, the cooling unit having at least one cooling disc which is arranged coaxially on a cooler shaft, which is connected to the shaft of the Tesla-type turbine in a rotationally fixed manner. Furthermore, the cooling disc has at least one cavity in the disc body forming the cooling disc, the cavity of the cooling disc being fluidically connected to the cavity of the compressor disc, so that cooling medium heated in the compressor unit can be fed to the cooling unit, by means of which the cooling medium can be cooled in the cooling disc of the cooling unit and can be fed back from the latter to the compressor disc of the compressor unit.

In other words, the compressor disc(s) is/are connected to a rotatable cooling unit in a rotationally fixed manner, the cooling unit also having a cooling disc or a plurality of cooling discs arranged coaxially on a cooler shaft, which is connected to the shaft of the Tesla-type turbine in a rotationally fixed manner, the cooling disc also having in its disc body a cavity for receiving cooling liquid, and cooling disc(s) being fluidically connected to the compressor disc(s) so that cooling liquid heated in the compressor unit can be supplied to the cooling unit, where the cooling liquid can be cooled in the disc or discs of the cooling unit and can be returned from the latter to the disc or discs of the compressor unit.

The cooling unit may also be referred to as a condenser, in particular a rotary condenser, and is adapted to communicate with the compressor unit, that is, in particular to exchange the cooling medium with the compressor unit.

The cooling unit also has discs, so-called cooling discs, which are arranged on a cooler shaft, the cooler shaft being connected to the shaft of the Tesla-type turbine in a rotationally fixed manner. In other words, the rotation of the discs of the Tesla-type turbine causes a rotation of the cooling discs. In this context, it is not excluded that the cooler shaft and shaft form a structural unit.

The cooling disc also has a cavity. This cavity of the cooling disc is connected to the cavity of the compressor disc so that a cooling medium, which is introduced or can be introduced into the cavities, can flow from the one cavity into the other. Said medium is in particular a cooling medium which has been heated in the compressor unit and flows from the cavity thereof into the cavity of the cooling disc for cooling purposes. In other words, heat is extracted from the cooling medium by means of the cooling disc. The cooled cooling medium is returned to the compressor unit or the compressor disc. In other words, the second cooling medium is circulated between the compressor disc and the cooling disc.

It is possible but not absolutely necessary that the same, in particular the same cooling medium is arranged in the cavity of a disc of the Tesla-type turbine as in the cavities of the compressor and/or the cooling discs. A first cooling medium can be arranged in the cavities of the discs of the Tesla-type turbine and a second cooling medium is arranged in the cavities of the compressor disc and/or the cooling disc.

The purpose of the cooling unit is to cool heated cooling medium in the compressor unit, which is typically, but not necessarily, partially in gaseous phase in the cavity of the compressor disc. In other words, the cooling unit typically serves to condense the cooling medium, which is why the cooling unit may also be referred to as a condenser.

The cooling unit comprises a coolant receiving chamber, for receiving and discharging a coolant, which flows at least partially about the cooling discs, so that the heat of the heated cooling medium can be given to the coolant, for the purpose of cooling the cooling medium before it is returned to the compressor unit, in particular the cavity of the compressor disc. The cooling medium may also be referred to as the outer cooling medium, while the cooling medium flowing between the cavities of the cooling disc and the compressor disc may be referred to as the inner cooling medium.

The cooling unit or rotary condenser and the compressor unit or rotary compressor may be fully integrated into one housing, in particular the same housing as the Tesla-type turbine. However, the coolant receiving chamber and the compressor gas receiving chamber are advantageously separated from each other by a separating unit, so that there is essentially no exchange between the gas in the compressor gas receiving chamber and the coolant in the coolant receiving chamber.

A first fluidic connection between the cavity of the compressor disc and the cavity of the cooling disc can be implemented via at least one transverse web which can be flowed through and is arranged between the compressor disc and the cooling discs substantially axially parallel to the axis of rotation of the shaft.

In other words, the apparatus comprises a first fluidic connection between the compressor disc or discs and the cooling disc or discs, which is realized by means of at least one transverse web between the discs, which can be flowed through and is arranged substantially axially parallel to the axis of rotation of the shaft.

In this case, the transverse web through which the flow can pass is advantageously formed by a tube or a plurality of tube sections, the tube cross section of the tube or the plurality of tube sections not necessarily having to be round.

For the purpose of realizing the fluidic connection, the flow-through transverse web has openings which permit a connection between the interior of the transverse web and the cavities of the cooling disc and compressor disc.

At least a second fluidic connection between a cavity of at least one compressor disc and a cavity of at least one cooling disc can be formed by a hollow connecting space in a shaft section, which extends from a shaft section covered by a compressor disc to a shaft section covered by a cooling disc. In this case, the covered shaft sections each have axially at least one opening for the purpose of realizing a flow of the cooling medium into and out of the hollow connecting space of the shaft, into and out of the cavity of the compressor disc and/or into and out of the cavity of the cooling disc.

In particular, this example realizes a flow from the hollow cavity of the compressor disc via the connecting space into the hollow cavity of the cooling disc.

In other words, the apparatus comprises a second fluidic connection between the compressor disc(s) and the cooling disc(s) which is realized by a cavity in a shaft section extending from a shaft section covered by the compressor disc(s) to a shaft section covered by the cooling disc(s), wherein the shaft or shaft section in question has axially at least one opening in each case to allow flow from the disc in question into the cavity of the shaft or in the opposite direction.

Advantageously, but not necessarily, the shaft on which the compressor discs are arranged and the cooler shaft can form a structural unit.

The covered shaft sections each have axially at least one opening. In other words, the respective cavities of said discs are connected to the connecting space via the opening in the covered shaft sections.

Advantageously, the respective shaft section has several openings distributed on its circumference preferably at regular intervals. The openings in the covered shaft sections of the cooling disc and/or the compressor discs can extend inclined with respect to a radial direction, so that the cooling medium flows tangentially into and/or out of the hollow connecting space. The openings in the covered shaft section of the cooling discs result in a tangential acceleration of the cooling medium as it exits the hollow connecting space.

By means of the first and the second fluidic connection, a closed cooling medium circuit of an inner cooling medium between compressor unit and cooling unit, in particular between the hollow spaces of the respective discs, can be realized for cooling, in particular condensing, the inner cooling medium.

In the cooling unit or the rotary condenser, the cooling medium inside the cooling discs has a higher density than in the discs of the evaporator or in the compressor unit. Corresponding to a natural circulation boiler, the condenser thus acts as a downcomer and the compressor as a riser system, only with the difference that the fluid or the cooling medium, following the centrifugal force, moves radially. In the condenser, the fluid moves outward away from the shaft axis, is directed through short tubes or the transverse webs into the evaporator or the compressor discs of the compressor unit, where it moves toward the shaft axis, i.e., radially inward. In the shaft are holes or openings designed as holes, which open the way into the hollow connecting space of the shaft, thus allowing the return of the fluid into the condenser section or the cooling unit. The shaft is axially sealed internally from the environment by orifice plates, thus forming the hollow connecting space.

The outer disc regions of the cooling discs of the cooling unit are flowed about by, for example, an external coolant, in particular ambient air, water from the environment or another external heat sink. These external flows are hermetically separated by a separator or separator disc that is guided into the turbine shell at the outer edge. In other words, in a compact design in which the Tesla-type turbine, compressor unit and/or cooling unit are integrated into a common housing, the external coolant is substantially separated in terms of flow from the gas surrounding the discs of the compressor unit and/or Tesla-type turbine.

The external coolant preferably enters in a region close to the shaft where the internal cooling medium still has a high vapor content. In this way, the condensation effect is stronger than if the opposite approach is taken. The compressor unit typically—but not necessarily—operates at approximately constant temperature and so does the internal cooling medium, which is in an evaporative state. Due to the increasing density of the working medium to be compressed in the compressor unit, there is increased heat flow density or heat transfer to the internal cooling medium, which is compensated for by increased vapor formation, keeping the temperature differential substantially constant throughout the compression section of the apparatus.

The rotary condenser or cooling unit may draw in ambient air as a coolant, which is brought up to rotational speed by helically shaped and spatially fixed blades placed about or attached to the shaft, in particular the cooler shaft. In this way, a suction effect is created and the acceleration losses at the discs are avoided. The air leaves the rotary condenser through preferably tangentially oriented openings at the outer edge of the coolant receiving chamber or turbine housing in the case where the elements of the apparatus according to the invention form a structural unit. In principle, a cooling liquid could also be drawn in as a coolant as an alternative to ambient air.

The effect of the apparatus for converting thermal energy into mechanical energy according to the invention includes in particular the fact that, due to the high efficiency of the integrated Tesla-type turbine, the entire apparatus can also be operated with a high efficiency, so that a relatively low thermal or chemical energy input is necessary in order to provide mechanical or electrical energy of the desired quantity.

A propeller element can be stationarily arranged in the hollow connecting space of the shaft section, so that a substantially axial flow movement of the cooling medium in the shaft can be realized upon relative rotational movement of the shaft about the propeller.

A fourth aspect of the invention is a method for converting thermal energy into mechanical energy, wherein in an apparatus for converting thermal energy into mechanical energy according to the invention, the method according to the invention for operating of a Tesla-type turbine is carried out. In this process, cooling medium heated in at least one compressor disc, in particular the cavity of a compressor disc, is fed to at least one cooling disc, in particular from the cavity of a cooling disc, and cooled there. After the cooling medium has cooled, it is fed back to a compressor disc.

In other words, in methods according to the invention, cooling fluid heated in the compressor disc(s) is supplied to the cooling disc(s) and cooled there, and after cooling is again supplied to the compressor disc(s).

A fifth aspect of the invention is a method of converting thermal energy into electrical energy, wherein the method of converting thermal energy into mechanical energy according to the invention is carried out and kinetic energy of the rotating shaft is converted into electrical energy by means of a generator.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
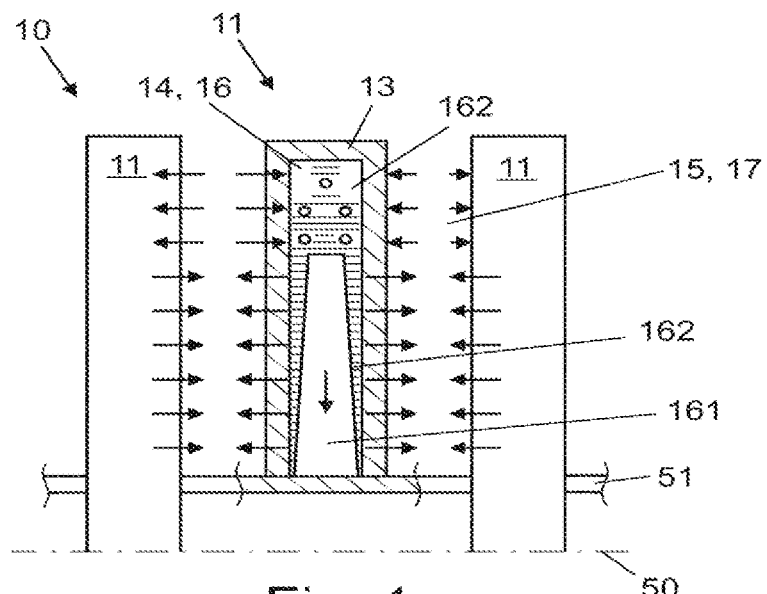
FIG. 1 shows a cutout of a Tesla-type turbine according to an exemplary embodiment of the invention.

FIG. 1 shows a cutout of a Tesla-type turbine 10 according to the invention. Three discs 11 are shown, which are arranged in a rotationally fixed manner on a shaft 51 and rotate about the axis of rotation 51. The middle one of the three substantially round discs 11 is shown as a cutout. It can be seen that the disc body 13 forming the disc 11 has a cavity 14 in which a cooling medium 16, in particular a cooling liquid, is received. Hot gas 17 is present in the disc space 15 which, on entering the Tesla-type turbine 10, flows tangentially relative to the discs 11, preferably at their outer circumferential surface, and thus causes the discs 11 to rotate about the axis of rotation 50. The gas 17 which flows against or around the discs 11 is also referred to as the working medium. This can be a flue gas from a combustion process or alternatively a noble gas such as xenon. The gas 17 is typically more than 100° C. hot, and has an increased pressure compared to ambient conditions. During operation of the Tesla-type turbine 10, the gas 17 transfers energy to the discs 11. The discs 11 are heated by the gas 17 during operation. The cooling medium 16 in the cavity 14 is used to cool the discs 11 during operation. The cooling medium 16 is, for example, water, although other organic or inorganic substances or mixtures of substances are not excluded.

FIG. 1 illustrates the cooling process of the discs 11 in an idealized manner. Primarily in the radially outer region, in which the gas 17 preferably enters the Tesla-type turbine 10 according to the invention, heat is transferred from the gas 17 located in the disc space 15 to the disc body 13 and subsequently to the cooling medium 16 located in the cavity 14. This heat flow is indicated in FIG. 1 by arrows pointing toward the cavity 14 of the discs 11. In the radially outer region of the cavity 14, the cooling medium 16 is present primarily as a liquid cooling medium 162.

The heat input causes the liquid cooling medium 162 to evaporate. The cooling medium 161, which is now present in gaseous form or as vapor, flows radially inwards inside the cavity 17. This flow movement is indicated in FIG. 1 by an arrow pointing toward the shaft 51. Near the shaft, condensation of the cooling medium 16 occurs, so that a film of liquid cooling medium 162 is formed on the walls of the cavity 14. The heat released during condensation is in turn transferred at the disc body 13 to the gas 17 located in the disc space 15. This heat flow is indicated in FIG. 1 by arrows pointing toward the disc space 15. The film of liquid cooling medium 162 moves radially outward due to the difference in density of the phases and the centrifugal forces generated by the rotation, where the liquid cooling medium 162 is evaporated again. In this way, internal cooling of the discs 11 of the Tesla-type turbine 10 is realized.

In other words, the discs 11 of the Tesla-type turbine 10 according to the invention are designed in such a way that they have an internal fluid circuit or cooling medium circuit in the cavity 14, so that evaporation occurs in the outer region and condensation of the cooling medium 16 occurs in the central, i.e. radially inner region as a result of external heat supply by, and heat dissipation to, a surrounding gas 17, for example a hot flue gas, which is used as a working medium for generating mechanical energy.

The disc body 13 is typically, but not necessarily, substantially made of a metal. The strength of metals is in principle dependent on temperature and decreases with the temperature of the gas 17. The Tesla-type turbine 10 according to the invention makes it possible, by means of internal cooling by means of the cooling medium 16, to provide for the use of light materials with low strength for the design of the disc body 13.

Figure 2:
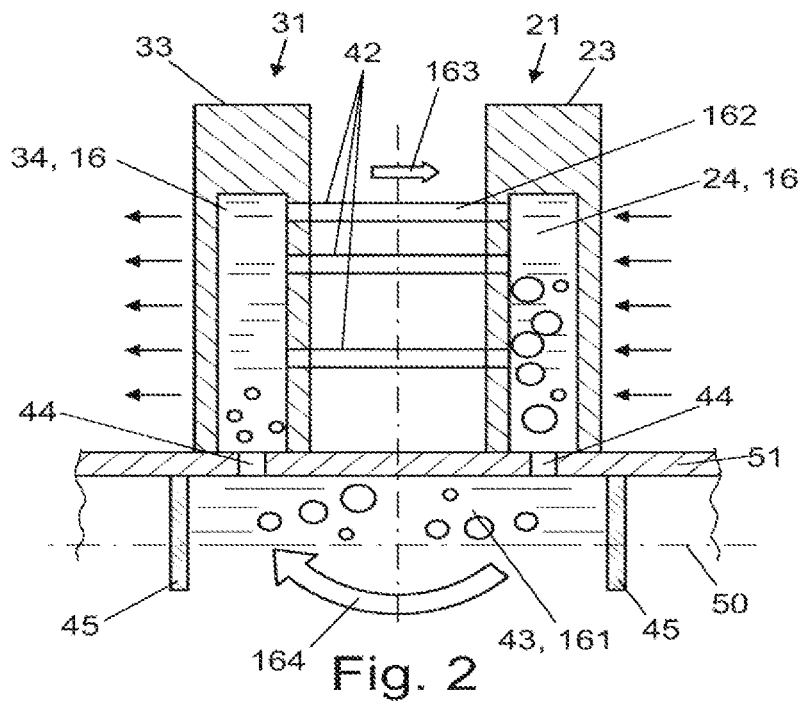
FIG. 2 illustrates an apparatus for converting thermal energy into mechanical energy according to the invention in an idealized manner, the interaction of a compressor disc and a cooling disc.

FIG. 2 shows in an idealized manner the interaction of a compressor disc 21 and a cooling disc 31. The disc bodies 22, 32 of both discs 21, 31 each form a cavity 24, 34. The cavities 24, 34 of the compressor disc 21 and the cooling disc 31 are fluidically connected to each other by means of transverse web 42. This means that the cooling medium 16 present in the two cavities 24, 34 can flow between the cavities 24, 34. In other words, the transverse webs 42 aligned parallel to the axis of rotation 50 form a first fluidic connection.

Both discs 21, 31 shown in FIG. 2 are arranged on a shaft 51 in a rotationally fixed manner, which rotates about an axis of rotation 50. Via the shaft section limitation 45, the shaft 51 forms a hollow connecting space 43 in its interior. The hollow connecting space 43 is fluidically connected to both the cooling disc 31 and the compressor disc 21 via the openings 44. In this way, a second fluidic connection is formed.

Figure 4:
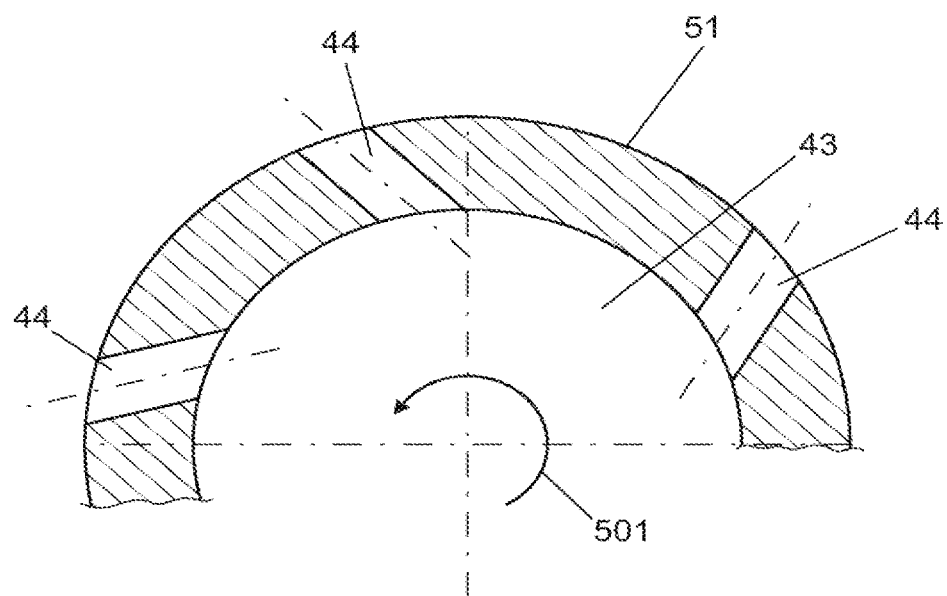
FIG. 4 illustrates a cutout perpendicular to the axis of rotation through the shaft of an apparatus according to the invention.

The heat flow in the space surrounding the discs 21, 31 is indicated by arrows in FIG. 4. In the area of the compressor disc 21, the gas surrounding the disc is warmer than in the area of the cooling disc 31. The heat transfer from the surrounding gas to the compressor disc 21 causes evaporation of the cooling medium 16 located in the cavity 24 of the compressor disc 21. In a similar manner to the process illustrated in FIG. 1, the portion of the cooling medium 16 in the gaseous phase flows radially inward and through the opening 44, which connects the cavity 24 of the compressor disc 21 to the hollow connecting space 43, into the hollow connecting space 43 of the shaft 51. In the hollow connecting space 43, the cooling medium 16, which here is primarily present as a gaseous cooling medium 161, flows in a second cooling medium flow 164 toward the cooling disc 31 and through the opening 44, which connects the cavity 34 of the cooling disc 31 with the hollow connecting space 43, into the cavity 34 of the cooling disc 31. Here in particular, cooling occurs and subsequently condensation of at least a portion of the gaseous cooling medium 161. The now substantially liquid cooling medium 162 is rotationally moved radially outward and flows through the transverse web 42 in a first cooling medium flow 163 into the cavity 24 of the compressor disc 21, where it is again heated and evaporated. In this way, a closed cooling medium circuit between a compressor disc 21 and a cooling disc 22 can be realized in principle. The process shown in FIG. 2 is to be understood as an idealized process.

Figure 3:
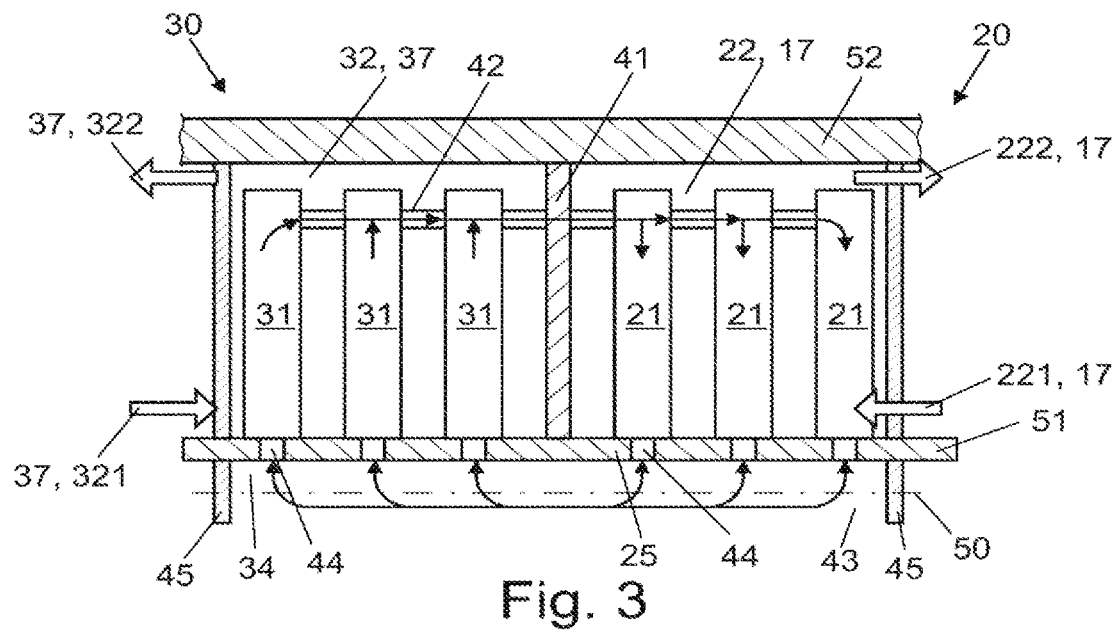
FIG. 3 illustrate a cutout of an exemplary embodiment of the apparatus for converting thermal energy into mechanical energy with three compressor discs and three cooling discs each.

FIG. 3 shows a cutout of an embodiment of the apparatus according to the invention for converting thermal energy into mechanical energy. The interaction of a compressor unit 20 with a cooling unit 30 is shown here. Each of the two units 20, 30 has, by way of example, three discs 21, 31, which are arranged on a shaft 51 in a rotationally fixed manner. Their cavities are interconnected to form a first fluidic connection, in this example by means of a transverse web 42. A second fluidic connection is realized via the hollow connecting space 43 and the openings 44.

In a similar way to the process illustrated in FIG. 2, the cooling medium 16, which is present in the cavities 24, 34 of the discs 21, 31, flows in a circuit. This circuit is illustrated in FIG. 3 by arrows.

The compressor unit 20 and the cooling unit 30 have a common housing 52. By means of a separating element 41, both units 20, 30 each form a separate receiving chamber 22, 32. This means that the cooling discs 31 are arranged in a coolant receiving chamber 32 and the compressor discs 21 are arranged in a compressor gas receiving chamber 22. The two receiving chambers 22, 32 are separated from each other by the separating element 41 in such a way that substantially no exchange of the media located in the receiving chambers 22, 32 takes place.

A heated gas 17 or working medium enters the compressor unit 20 in the illustrated embodiment through a gas volume flow inlet, which is preferably arranged in a radially inner region of the compressor unit 20. The gas 17 transfers heat to the compressor discs 21 in the compressor unit 20. In the process, the cooling medium 16 present inside the compressor discs 21 is heated and preferably vaporized. The gas 17, which is now colder than the gas inlet temperature, leaves the compressor gas receiving chamber 22 through a gas volume flow outlet 222, which is preferably arranged in the radially outer region of the compressor unit 20.

The heated and at least partially vaporized cooling medium 16 flows radially inwardly inside the compressor discs 21 and through the openings 44 of a shaft section 25 covered by a respective compressor disc 21 into the hollow connecting space 43 inside the shaft 51, which is bounded by the shaft section limitation 45. From the hollow connecting space 43, the cooling medium 16 flows through openings 44 of a shaft region 35 covered by a respective cooling disc 31 into the cavity 34 of the respective cooling disc 31 of the cooling unit 30. The cooling discs 30 are arranged in a coolant receiving chamber 32. A coolant 37 enters the coolant receiving chamber 32 via a coolant inlet 321, which is preferably arranged close to the shaft. While the coolant 16 inside the discs 21, 31 is preferably a cooling liquid which can be evaporated, ambient air can also be used as coolant 37. However, it is not excluded that the cooling medium 37 is also a cooling liquid. In particular, it is not excluded that the coolant 37 has the same material composition as the cooling medium 16.

Heat is transferred from the cooling medium 16 to the coolant 37 via the disc bodies of the cooling discs 31. In particular, so much heat is transferred that the cooling medium 16 condenses and passes from the gaseous to the liquid phase. Due to the differences in density between the phases and centrifugal forces acting as a result of the rotation, the liquid cooling medium 16 is moved radially outwards on the inside.

The rotation of the discs 21, 31 is caused by the fact that the shaft 51, on which the discs 21, 31 are arranged, is connected in a rotationally fixed manner to a turbine, in particular a Tesla-type turbine 10 according to the invention.

FIG. 4 shows a cut perpendicular to the axis of rotation 51 through the shaft 51 on which the cooling discs are arranged in a rotationally fixed manner. The cut shown lies in a plane in which the openings 44 are arranged. It can be seen that the shaft 51 has a hollow connecting space 43 in its interior. It can also be seen that the openings 44 are arranged at regular intervals around the circumference of the shaft 51. In the present embodiment, the openings 44 are cylindrical bores. In this case, the axis of a respective hole extends at an inclination with respect to a radial direction. An angle formed between the axis of the hole and the radius of the shaft 51 is acute in the direction of rotation 501.

In the present example, the openings 44 are to be designed such that no excessive impact loss occurs in the downstream flow behind the openings 44. The inlet to the cavity of the cooling disc is preferably to be designed in such a way that a certain lead is produced at the inlet in order to reduce the work inception of the cooling medium.

Figure 5:
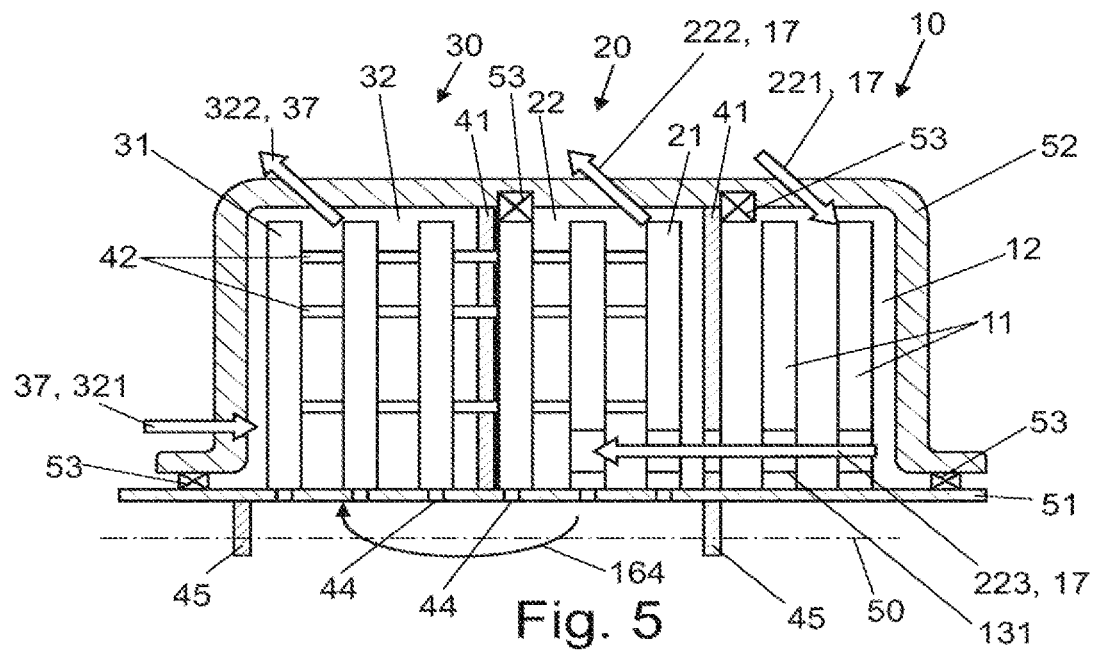
FIG. 5 illustrates an exemplary embodiment of the apparatus for converting thermal energy into mechanical energy according to the invention, in which the Tesla-type turbine, compressor unit and cooling unit are arranged in one housing.

FIG. 5 shows an embodiment of the apparatus for converting thermal energy into mechanical energy according to the invention. In the embodiment shown, the Tesla-type turbine 10, the compressor unit 20 and the cooling unit 30 are arranged in a housing 52. Seals 53 are disposed between the housing 52 and the rotating shaft 51.

In the embodiment shown, the Tesla-type turbine 10 comprises two discs 11. The discs 11 preferably have disc cooling as shown in FIG. 1. The gas 17 enters the gas receiving chamber 12 of the Tesla-type turbine 10 via the gas volume flow inlet 221 and thereby flows preferably tangentially relative to the discs 11. This sets the discs 11 in rotation about the axis of rotation 50. Both the discs 11, as well as the compressor discs 21 and the cooling discs 31, are arranged on a common shaft 51 in a rotationally fixed manner. Consequently, a rotation of the discs 11 leads to a rotation of the compressor discs 21 and the cooling discs 31. In the Tesla-type turbine 10, the gas 17 is at least partially expanded and cools down.

The gas 17 flows into the compressor gas receiving chamber 22 of the compressor unit 20 via a gas volume flow transition 223 arranged close to the shaft. For the purpose of enabling this gas flow, the discs 11 have disc openings 131 in an area close to the shaft. The separating element 41 between the gas receiving chamber 12 and the compressor gas receiving chamber 22 also has at least one opening near the shaft. In the radially outer region, a seal 53 is arranged on the gas receiving chamber side in the embodiment shown.

In the compressor unit 20, the expanded working medium or gas 17 transfers heat to the compressor discs 21. As shown in FIG. 2, the compressor discs 21 has a cavity, in which a cooling medium 16 is received. The cooling medium 16 may be the same cooling medium 16, which is received in the cavities of the discs 11 of the Tesla-type turbine 10. The cooling medium 16 inside the compressor discs is evaporated by means of the heat from the gas volume flow 17. The latter is compressed in the compressor unit 20 and flows out of the compressor unit 20 via the gas volume flow outlet 222 and can be fed to a burner or heat exchanger device for the purpose of reheating.

Next to the compressor unit 20, a cooling unit 30 is arranged in the same housing 52. The coolant receiving chamber 32 of the cooling unit 30 is separated from the compressor gas receiving chamber 22 of the compressor unit 20 by means of a separating element 41. In addition, a seal 53 is also provided here radially on the outside of the compressor gas receiving chamber. Analogous to the illustration in FIG. 3, cavities of the compressor discs 21 are connected by means of transverse webs 42 in a first fluidic connection with cavities of the cooling discs 31, three transverse web connections arranged in parallel being provided in this embodiment. Also analogous to FIG. 3, a second fluidic connection is formed between the cavities of the compressor discs 21 and the cooling discs 31 via the openings 44 and the hollow connecting space 43 formed via the shaft section limitation 45. The cooling medium 16 can thus be circulated between the compressor unit 20 and the cooling unit 30 or its discs 21, 31.

Also shown in FIG. 5 is the coolant inlet 321 close to the shaft. In the cooling unit 30, the heat of the cooling medium 16 heated in the compressor unit 20 to the coolant 37 is indicated. In particular, the cooling medium 16 is condensed in the cooling unit 30.

Figure 6:
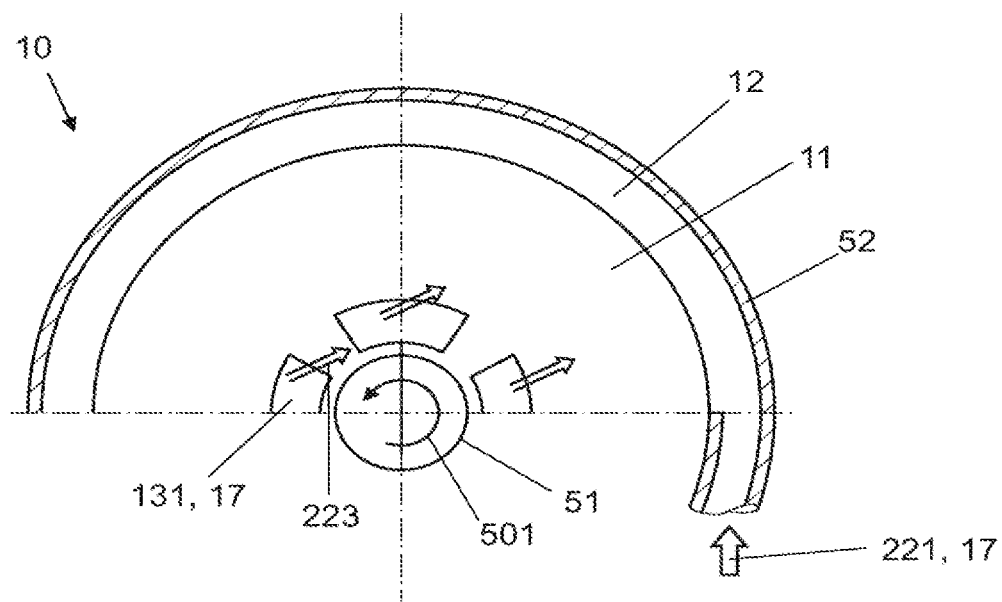
FIG. 6 illustrates a cut through the Tesla-type turbine according to the invention perpendicular to the axis of rotation.

FIG. 6 shows a cut through the Tesla-type turbine 10 according to the invention perpendicular to the axis of rotation 50, as shown in the embodiment according to FIG. 5. The tangential gas volume flow inlet 221 into the gas receiving chamber 12, which is radially bounded by the housing 52, can be seen. The gas flow thereby frictionally accelerates the disc 11 and thus generates a rotation 501. Also visible are the disc openings 131 arranged close to the shaft 51, through which the gas 17 flows in the direction of the compressor unit. In FIG. 6 it is indicated that the gas 17, when passing through the disc opening 131, experiences an acceleration with at least one directional component radially outward against the direction of rotation 501.

Figure 7:
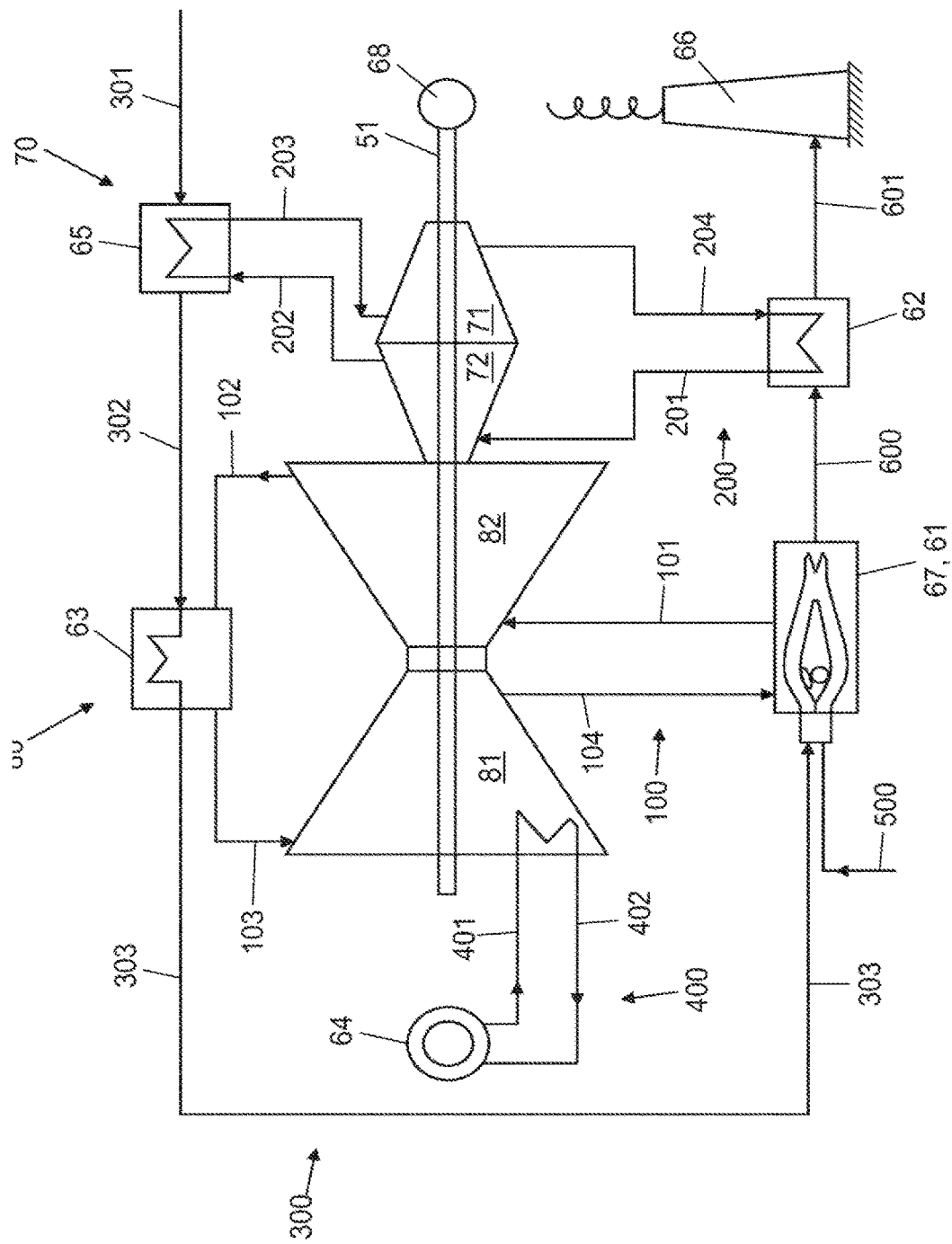
FIG. 7 illustrates an embodiment of the method for converting thermal energy into electrical energy according to the invention as a system flow diagram.

In FIG. 7, an embodiment of the process for converting thermal energy into electrical energy according to the invention is shown as a system flow diagram.

By way of example, the system flow diagram represents a sliding mode. This means that compression takes place at a higher temperature level in order to be able to extract heat for external use. The numerical values for temperatures and pressures given below are to be understood as examples.

The process shown comprises a low-pressure section 70 and a high-pressure section 80. The process can also be referred to as a gas turbine process. A circulation of a first working medium 100 in the high-pressure section 80, as well as a second working medium 200 in the low-pressure section 70 can be seen. Also shown is the supply of combustion air 300 to a combustion chamber 67, which is first preheated by means of a fourth heat exchanger 65 and then by means of a third heat exchanger 63 and supplied as preheated combustion air 303 to the combustion chamber 67. In addition, the flow of a heat transfer medium 400 is shown. The flue gas 600, after being cooled via a second heat exchanger 62, is discharged as cooled flue gas 601 via a stack 66.

A fuel 500 is burned in a combustion chamber 67 for the purpose of generating heat. The combustion chamber 67 can in principle be operated with any fuel. Accordingly, it can be equipped with solid fuel firing or with burners for fluid fuels. The walls of the combustion chamber 67 are preferably cooled with the available media of the process, in particular the first working medium 100, or else designed from refractory material.

For combustion, a fuel 500 and preheated combustion air 303 are supplied to the notionally adiabatic combustion chamber 67. The flue gas 600 formed there leaves the combustion chamber 67 at about 2000° C. or is present therein at the corresponding temperature. In a first heat exchanger 61, also called a waste heat exchanger, which is located downstream of or directly adjacent to the combustion chamber and which can also be structurally connected to the combustion chamber walls in order to partially cool them, the flue gas 600 is first cooled to a temperature of approx. 500° C., then fed to a second heat exchanger 62, which may also be referred to as an economizer, for heating the second working medium 200 for the low-pressure turbine or the low-pressure flash tank 72, and fed into the stack 66 at about 100° C. as the cooled flue gas 601.

The heat emitted from the flue gas 600 is used to heat the first working medium 100, which enters the first heat exchanger 61, the waste heat exchanger, as a compressed first working medium 104 having a temperature of about 400° C. and exits as a heated working medium 101 having a temperature of about 1500° C. The first working medium 100 is preferably xenon or an alternative noble gas. The heated as well as the compressed first working medium 101, 104 are under a pressure of about 15 bar without taking into account minimal pressure differences that occur as a result of transport. In a high-pressure flash tank 82, the first working medium 101 is reduced to a pressure of 1 bar, while at the same time being cooled to a temperature of about 400° C., before it leaves the high-pressure flash tank 82 as expanded first working medium 102. The expansion process preferably takes place partially or completely isothermally at a working temperature higher than 400° C., but not at temperatures higher than the inlet temperature of the working medium 101. In this embodiment of the method, the high-pressure flash tank 82 comprises at least one Tesla-type turbine according to the invention or is formed by such a turbine. The first working medium 100 consequently corresponds to the gas volume flow or the gas in FIGS. 1 to 6.

The level of the working temperature in the high-pressure flash tank 82 depends on the selected cooling medium and on the material of the expansion discs or discs of the Tesla-type turbine.

The output shaft work is transmitted to a generator 68 via the shaft 51, in which a conversion into electrical energy takes place. Within the expansion stage, the heated first working medium 101 is first reduced to a working temperature, whereby the dissipated heat is fed back to the heated first working medium 101 during the actual expansion. In this way, the temperature remains almost constant during the expansion. The final phase of the expansion is nearly isentropic in order to minimize exegetic losses.

The expanded first working medium 102 is further cooled in a third heat exchanger 63, which acts as an air preheater for the combustion process, at approximately the same pressure to a cooled first working medium 103 with a temperature level of 80 to 200° C., after which it enters a high-pressure compressor 81. In the high-pressure compressor 81, which is preferably designed as a compressor unit, an isothermal pressure increase to 15 bar takes place, whereby the pressure increase can also take place isentropically in the final phase of this process step; correspondingly the temperature would increase by a certain amount. The extent to which this is permitted depends on the material of which the compressor discs 21 in the high-pressure compressor 81 are made and what exegetic loss is acceptable in terms of heat transfer. The compressor discs 21 are cooled by a cooling medium 16 circulating internally in the compressor discs 21 or in the cavity 24 of the compressor discs 21. This cooling medium 16 transfers its heat to a heat transfer medium 400 coming from the environment. The cool heat transfer medium 401 is fed from a heat sink 64 to the high-pressure compressor 81, where it is heated and returned to the heat sink 64 as a warm heat transfer medium 402 at an elevated temperature level. The heat transfer medium 400 is typically ambient air or water. The compressed first working medium 104 is fed to the first heat exchanger 61, thus closing the circuit of this first working medium 100.

In the low-pressure section 70, the flue gas 600 exits the combustion chamber 67 at a temperature of 500° C. In the embodiment shown, this temperature level is used in a second gas turbine process, which is at low pressure. Analogous to the high-pressure turbine, the low-pressure turbine has a low-pressure flash tank 72, which operates at about 400° C. and 5 bar, and a low-pressure compressor 71, which is designed to be isothermal and at the outlet of which a compressed second working medium 204 is discharged at a temperature of about 50° C. and a pressure of about 5 bar.

In the embodiment shown, the low-pressure turbine and the high-pressure turbine are arranged on the same shaft 51.

This low-pressure flash tank 72 is designed with cooled discs in a similar manner as the high-pressure flash tank 82 of the high-pressure section 80. The waste heat from the low-pressure flash tank 72 is used to heat the ambient air 301 at about 10° C. to an intermediate-heated combustion air 302 at about 80° C. in a fourth heat exchanger 65, which can also be referred to as a low-temperature preheater. The ambient air 301 falls at about 10° C. so that the expanded second working medium 202, which is preferably also xenon or another noble gas, can be cooled to a cooled second working medium 203 at about 20° C. The required cooling flow for the low-pressure compressor 71 comes from the environment and is of no thermal value. The low-temperature turbine could also be run in sliding mode to extract process heat.

As an alternative to the low-temperature gas turbine, a Rankine process could also be designed. This would have the advantage that heat would be generated that could be used for special process purposes.

Figure 8:
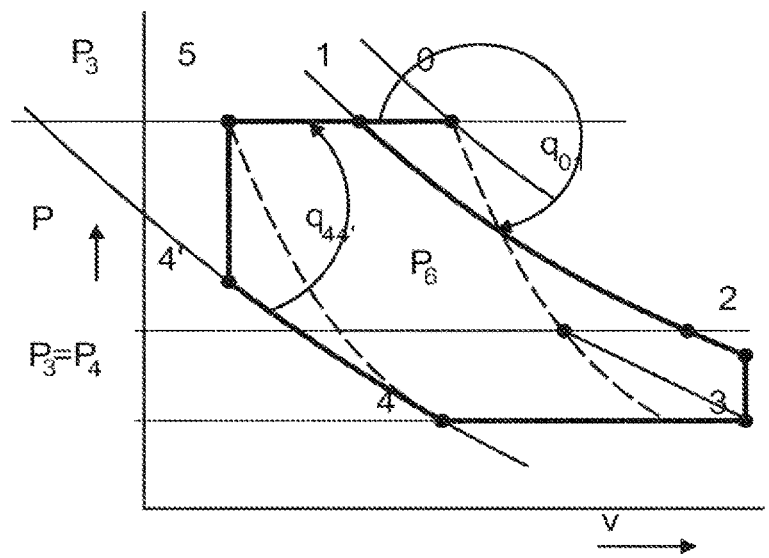
FIG. 8 illustrates a p-V diagram for expansion and compression of the first working medium in the high-pressure or high-temperature range according to FIG. 7.
Figure 9:
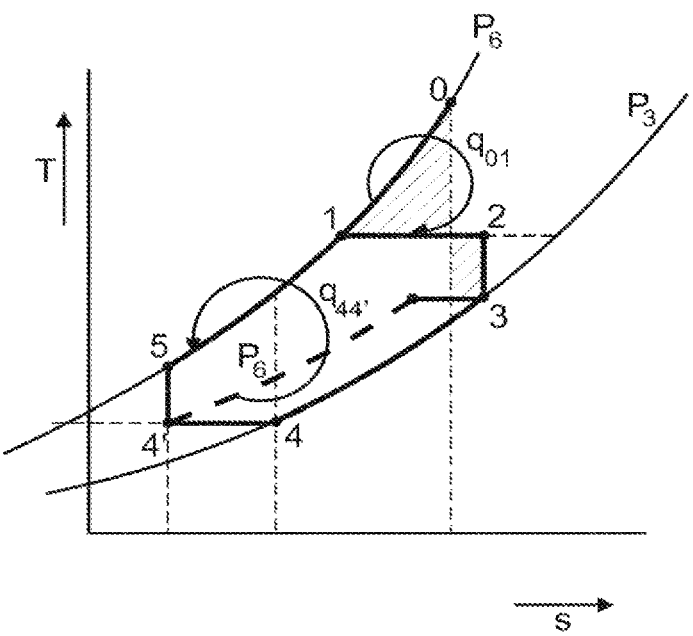
FIG. 9 illustrates a T-s diagram associated with FIG. 8 for expansion and compression of the second working medium in the high-pressure or high-temperature range according to FIG. 7.

FIG. 8 shows a p-V diagram for expansion and compression of the first working medium in the high-pressure and high-temperature range, respectively, as shown in FIG. 7. FIG. 9 shows the T-s diagram associated with FIG. 8 for expansion and compression of the second working medium in the high-pressure and high-temperature range, respectively, as shown in FIG. 7.

The p-V diagram shows the integrals for the technical work to be supplied and obtained. From the T-s diagram, the corresponding heat integrals for heat supply and heat removal can be read. After partial isothermal compression, which in FIGS. 8 and 9 corresponds to the change of state from 3 to 4, the working medium is isentropically compressed further to the final temperature or final pressure, which in FIGS. 8 and 9 corresponds to the change of state from 4 to 5. Alternatively, the fluid could be compressed completely isothermally, which corresponds to the change of state from 3 to 5 in FIGS. 8 and 9, but this would require more cooling. The higher cooling energy thus produced would preferably be additionally absorbed by the combustion air in the combustion chamber, which in any case absorbs the energy of the change of state from 3 to 4. This would result in certain exegetic losses due to transmission losses, but there may be constructive and thus also economic advantages in proceeding in this way.

After isobaric cooling, the first working medium is isothermally compressed, although here, too, compression could only be partially isothermal, if it was permitted that isentropic compression take place in the final phase of this step. This degree of freedom is needed to optimize the design economically, as in the case of high-temperature compression. This case is represented in FIGS. 8 and 9 by the lower limitation boundary line for the compaction. The boundary lines above represent the sliding mode as an example. The inlet temperature to the flash tank could also slide, but for exegetic reasons it makes sense to always operate the flash tank at maximum temperature.

In contrast to expansion, where the temperature of the working medium constantly decreases in the isentropic case, the temperature constantly increases in isentropic compression. This behavior is represented by the dashed lines in FIG. 8. This also tends to be true for the partially isothermal process steps, with the temperature tending to decrease during expansion in the range from state 0 to state 3 and increasing during compression from state 4 to state 5. This means that heat must be added in the working range during expansion and removed during compression, so that isothermal or, as shown in FIGS. 8 and 9, partially isothermal changes of state can occur.

Figure 10:
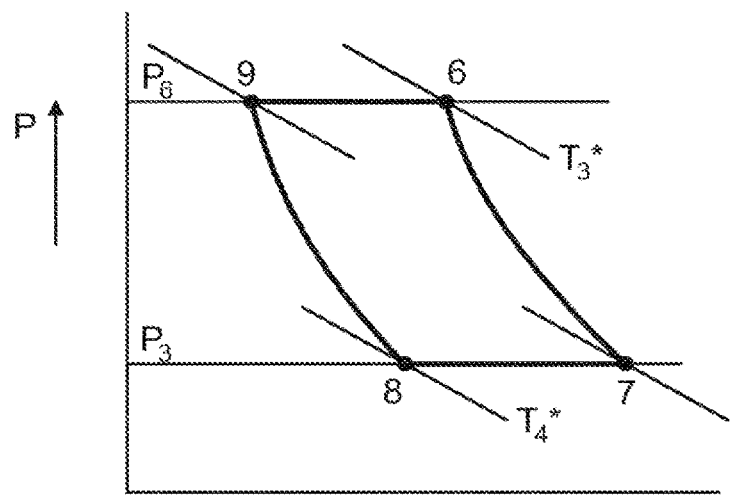
FIG. 10 illustrates a p-V diagram for expansion and compression of the second working medium in the low-pressure or low-temperature range according to FIG. 7.

FIG. 10 shows a p-V diagram for expansion and compression of the second working medium in the low-pressure and low-temperature range, respectively, as shown in FIG. 7.

Figure 11:
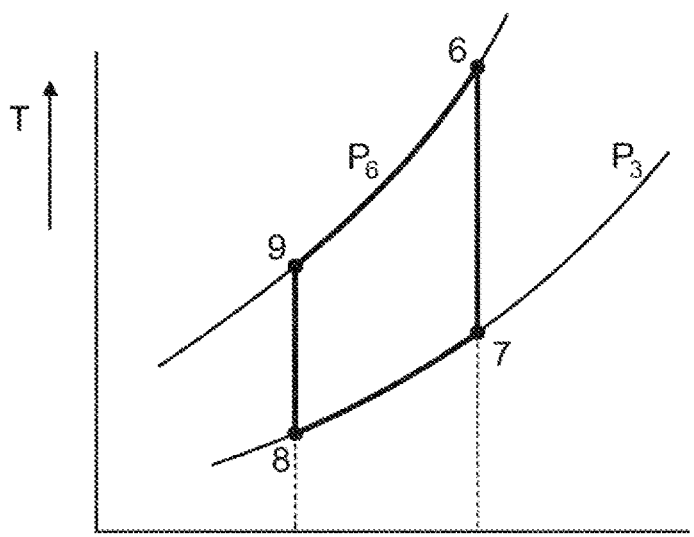
FIG. 11 illustrates a T-s diagram associated with FIG. 10 for expansion and compression of the second working medium in the low-pressure or low-temperature range according to FIG. 7.

FIG. 11 shows the T-s diagram associated with FIG. 10 for expansion and compression of the second working medium in the low-pressure or low-temperature range according to FIG. 7.

The mode of operation of the Tesla-type turbine according to the invention and the apparatus for converting thermal energy to mechanical energy according to the invention, as well as the respective methods for operating the Tesla-type turbine according to the invention and the apparatus according to the invention, can also be illustrated as follows.

In the following, unless otherwise indicated, the terms condenser and rotary condenser are understood to mean a cooling unit.

In embodiments of the invention, the following applies:

The term cooling fluid is to be understood as cooling medium, wherein internal fluid is to be understood as the cooling medium in cavities of discs, compressor discs and/or cooling discs. The term external coolant or cooling medium is understood to mean a coolant which flows against or about the cooling discs. The terms flue gas and working medium are to be understood as gas and gas volume flow, respectively. A flash tank is hereinafter understood to mean a flash tank, which is preferably designed as a Tesla-type turbine according to the invention, hereinafter also referred to as a disc turbine. An element, which is referred to as a compressor below, corresponds to a compressor unit.

Tesla-Type Turbine:

Gas turbines are limited by the material of the force-absorbing elements of the rotor. This can be compensated for by cooling these elements internally, by passing cooling medium through them and allowing it to flow with the working medium, or by a conservative cooling process in which the cooling medium is retained.

The former is prior art, using water vapor or air as cooling media. The latter is also prior art, but with the limitation that the cooling medium, preferably water, is supplied to the blades via the rotor shaft and evaporates in the blades.

The vapor is returned to the rotor shaft and, preferably by force dissipation, expanded, condensed and returned to the blades.

However, the cooling medium condensed in this way can also be used in another way, in that it does not leave the force-absorbing elements of the rotor at all, but evaporates and condenses quasi in situ, as is the case with so-called "heat pipes." The simplest way to achieve this is with rotating discs of a disc turbine (Tesla) as shown in FIG. 1, where the necessary condition is that the discs are hollow and contain a cooling medium. As the discs rotate, the cooling medium is forced to the outer edge of the disc, where it is vaporized by hot gas in the vicinity of the disc. The vapor has a much lower density than the liquid, so it can always be displaced by liquid. This accommodates the fact that the heat flow densities at the outer edge of the disc are particularly high, but that the liquid is able to absorb high heat flow densities without forming vapor cushions.

For continuity reasons, the vapor is directed to the central area of the disc, where it condenses, since the flue gas is colder near the shaft. The heat flows (absorption and release) are adjusted via the boiling temperature, the liquid quantity and the gas temperatures, so that the absorbing flow is equal to the releasing flow. Due to the heat dissipation in the outer disc area, the gas is not able to do any work on the disc, or only to a very limited extent. This means that in this area, heat transfer mainly takes place around the "inner" medium. In the central area of the disc, the heat is transferred back to the gas, which, however, is associated with equivalent work. This means that the gas transfers approximately isothermal force to the disc. The process can be idealized in the p-v and T-s diagrams.

In a first change of state, from state 1 to state 2, the temperature of the flue gas is reduced from $T_1$, i.e. the temperature in state 1, to approximately the boiling temperature $T_s$. In the real process, a certain small temperature difference between the internal working medium and the flue gas would remain. The heat transfer takes place isobarically, thus without any work being transferred to the disc.

The heat absorbed by the inner fluid in a first change of state from a state 1 to a state 2 is transferred to the flue gas in a change of state from a state 2 to a state 3 with simultaneous work being performed. The work thus done is equal to the heat absorbed by the inner fluid between states 1 and 2. This means that the change of state is isothermal.

Since the flue gas is working against a pressure of P0 and the heat to support the isothermal change of state is consumed, the change of state from a state 3 to a state 4 results in adiabatic/isentropic relaxation from pressure $P_3$ to $P_0$-$P_4$.

The corresponding temperature, $T_4$, is higher compared to that which would occur with complete adiabatic/isentropic relaxation between pressures $P_1$ and $P_0$. The temperature difference between $T_4$ and $T_0$ is a measure of the energy loss that occurs as a result of the heat transfer to the internal fluid at a minimum. The actual energy losses are even higher, since a driving temperature difference is required for the heat transfer itself. It is desirable to have the boiling temperature $T_s$ as low as possible, because then the strength values of the disc material increase strongly, which in turn would result in higher disc speeds and thus a reduction in the equipment required for the entire turbine design. The energy loss itself increases strongly and progressively as $T_s$ approaches the temperature $T_4$ or $T_0$. The value $T_0$ would even lead to the requirement of an additional drive. That is, the turbine would be at a standstill.

Material Problem:

The strength behavior of metals depends on temperature.

The working capacity of a turbine can be represented in terms of absorption capacity by a proportionality approach, whereby the strength decreases progressively with increasing working temperature. This means that by cooling the turbine disc or (in the case of other designs) the blades, the working capacity can be increased considerably. With cooled discs, it is therefore possible to provide lightweight materials with low strength without the risk of breakage, and at the same time the designs of disc turbines in particular become much more compact.

Aspects relating to the disc turbine according to the invention:

1. Discs of disc turbines with an internal fluid circuit cooled in such a way that evaporation occurs in the outer area and condensation in the central area as a result of external heat supply and heat dissipation, preferably by hot flue gases used as a working medium to obtain mechanical energy.
2. The disc shells are connected to each other by sleeves that allow external fastening, thus enabling the combination of several discs.
3. Organic or inorganic fluids and metals can be used as cooling media.
4. Instead of discs, blade elements can also be used (radial turbine).

Apparatus for Converting Thermal Energy into Mechanical Energy:

The largely isothermal flash tank described above is part of a closed gas turbine process. However, the entire process also includes a combustion chamber, which in this case is externalized, and a compressor. In this way, it is possible to use a sensibly adapted working medium such as xenon (preferably) or other noble gases. Noble gases are useful, because they are not able to radiate, since they are monatomic. The radiation of the gas body would lead to an increased heat transfer, which would cause the danger that the gas body between the discs of the turbine would cool down too fast and thus would not be able to transfer any work to the discs or only to a very small extent.

There are two fundamentally different working models for the operation of the entire process:

Isothermal compression at a raised temperature level, such that after expansion the working medium is not cooled or is cooled to a certain extent but is compressed, which would allow the use of the remaining energy by external sinks, and Isothermal compression at the lowest temperature level, such that after expansion the working medium is first cooled and then compressed, which would lead to maximization of thermal efficiency.

In the first case, some residual energy would remain in the working medium, which would decrease the thermal efficiency, but there would still be thermal energy left for serving external sinks. In principle, however, the gas turbine process can be designed by recuperating the waste heat after expansion in such a way that no second power process would have to be connected downstream, since the force transmitters (discs) can be subjected to very high thermal loads. This means that gliding operation is possible both in the flash tank and in the compressor. Preferably, however, only the compressor should be operated in sliding mode for exegetic reasons.

Partial Isothermal Compression

From a pressure-volume diagram, the integrals for the technical work to be supplied and extracted can be read off, and from the associated temperature-entropy diagram, the corresponding heat integrals for supply and discharge. This is shown by way of example in FIGS. 8 and 9. After partial isothermal compression (change of state from 3 to 4), the working medium is further compressed isentropically (change of state from 4 to 5) to the final temperature or final pressure. Alternatively, the medium could be compressed completely isothermally (change of state from 3 to 5), which would, however, require more cooling. The higher cooling energy thus produced would preferably be additionally absorbed by the combustion air in the combustion chamber, which in any case absorbs the energy of the change of state from 3 to 4. This would result in certain exegetic losses due to transmission losses, but there may be design and thus economic advantages to proceeding in this way.

Maximum Thermal Efficiency

After isobaric cooling, the working medium is isothermally compressed, although here, too, compression could only be partially isothermal if it was permitted that isentropic compression take place in the final phase of this step. This degree of freedom is needed to optimize the design economically, as in the case of high-temperature compression. The inlet temperature to the flash tank could also slide, but for exegetic reasons it makes sense to always operate the flash tank at maximum temperature.

The waste heat from the combustion chamber (cf. FIG. 7) can be used to run a second cycle, but this does not require cooled disc elements, because the temperature level is much lower (cf. FIG. 7). However, it is advantageous to also run this process with xenon or another gaseous working medium, which has a low heat capacity. The low heat capacity makes it possible to design the corresponding disc turbine with an expansion stage. The low temperature process can also be run in a sliding mode to allow heat extraction to provide useful heat.

Design Solutions

In contrast to expansion, in which the temperature of the working medium constantly decreases in the isentropic case, the temperature constantly increases in isentropic compression. This also tends to be the case for the partially isothermal process steps, whereby, shown in a p-V or T-s diagram, the temperature tends to decrease during expansion in the range from a state 0 to a state 3. During compression, the temperature increases from a state 4 to a state 5. This means that heat must be added in the working range during expansion and dissipated during compression, so that isothermal or partially isothermal changes of state can occur. During expansion, the heat is distributed within the disc in such a way that the heat dissipated in the outer area of the disc (far from the shaft) is fed back to the inner area (close to the shaft) to the same extent. The "residual area" of the disc, which is in the area close to the shaft, allows isentropic relaxation.

In the case of compression, this principle of heat distribution would have to be reversed in such a way that heat would be dissipated in the inner area of the disc and heat would be returned to the working medium to the same extent in the upper area. The cooling medium inside the disc forms a two-phase flow. However, since the cooling medium is also subject to centrifugal force, phase separation would occur in such a way that the liquid portion would be forced outward, and in the area near the shaft there would be only vapor, which means the heat distribution requirement cannot be solved in this way. However, if the condensation is transferred to another disc system, which corresponds to the compressor in terms of the cooling medium, the heat distribution problem would be solved.

The condenser communicating with the compressor is shown in principle in FIG. 2 and in FIG. 5 with respect to a possible embodiment with three discs each for evaporation at almost isothermal compression for the working medium around the discs and for condensation when heating the cooling medium water, air, etc. The choice of a certain number of discs has been made for the sake of clarity. The choice of the number of discs depends on general fluid mechanical considerations, which are irrelevant for this basic description. The outer disc areas are flowed about by the working medium or by an external cooling medium (ambient air, water from the environment or another external heat sink). The external flows are hermetically separated by a cutting disc, which is guided into the turbine shell at the outer edge. The insertion of the cutting disc into the turbine shell symbolizes the sealing effect; alternatively, a frictional seal, as is common in blade turbines, between the outer disc dimension and the housing could also have a sealing effect. Two further cutting discs are also shown in FIG. 5 to delimit the left and right peripheries. An overall illustration of the design principle of the high-pressure section of the turbine is shown in a largely self-explanatory manner in FIG. 7.

Internal Cooling Mechanism

In the rotary condenser, the cooling medium has a higher density than in the evaporator or compressor. Corresponding to a natural circulation boiler, the condenser thus acts as a downcomer and the compressor as a riser, the only difference being that the fluid moves radially following the centrifugal force. In the condenser, the fluid moves outward away from the shaft axis, and is directed through short tubes into the evaporator, where it moves toward the shaft axis. There are holes in the shaft that open the way into the shaft, allowing the fluid to be returned to the condenser area. The shaft is axially sealed internally from the environment by orifices. The external cooling medium preferably enters in the area close to the shaft, where the internal cooling medium still has a high vapor content. In this way, the condensation effect is stronger than if the opposite approach is taken. The compressor operates at approximately constant temperature and so does the internal cooling medium, which is in the vaporization state. Due to the increasing density of the working medium, there is increased heat flow density or heat transfer to the inner cooling medium, which is compensated by increased vapor formation, keeping the temperature difference constant throughout the compression area.

Rotary Condenser

The rotary condenser is fully integrated into the turbine housing, which is formed of two eccentrically arranged half-shells. The rotary condenser preferentially draws in ambient air, which is brought up to rotational speed by means of helically shaped blades placed around the shaft and fixed in space. In this way, a suction effect is created and acceleration losses at the discs are avoided. The air leaves the rotary condenser through tangentially oriented openings on the outer edge of the turbine housing. In principle, a cooling liquid could also be drawn in, but this would have the disadvantage that the temperature increase would be rather small, because it is difficult to guide the necessarily small mass flows by means of an apparatus in such a way that sufficiently good heat transfer is possible. In addition, the feed must be carefully sealed in the case of liquids. The discs of the condenser must be spaced as far apart as possible so that as little work as possible is supplied to the fluid. The work feed should be large enough to compensate for the pressure loss in the downstream external heat exchanger. On the other hand, care must be taken to ensure that the heat transfer is sufficiently large to obtain a sufficiently small heating surface. The design ultimately forces an economic optimization. Rather disadvantageous is a complete externalization of the cooling, i.e. not placed around the shaft and connected to it, because this requires a discharge of the internal cooling medium into a space-saving design. This would require special sealing because of the combination of a fixed design (heat exchanger) with a rotating design.

The inner cooling medium can experience a delay on its way to the outer edge due to the Coriolis effect. This means that the sum of the Coriolis forces occurring can have a driving effect on the turbine.

This means that work would have to be done to compensate for this effect. This work input can be avoided by equipping the discs internally with radially oriented steering elements or steering grooves that prevent tangential motion.

Rotary Condenser

Like the rotary condenser, the rotary compressor is fully integrated into the housing. The rotary compressor takes up the expanded working medium in the area close to the shaft, i.e. it is located directly next to the flash tank. Like the external cooling medium, the compressed working medium leaves the compressor via tangentially oriented openings at the end of the two eccentric headers and is fed to the combustion chamber for heating.

The internal cooling medium experiences tangential acceleration on its way from the outer edge of the disc toward the shaft due to the Coriolis effect, which results in work delivery to the disc. The work source is caused by tangential frictional force. In this way, at least part of the compressor work can be compensated. At the inlet to the discharge holes in the shaft, the Coriolis velocity (lead of the medium in the tangential direction) is converted into pressure energy, as the fluid must yield to the steering constraint of the design. The holes should preferably be designed in such a way that no excessive impact loss occurs in the downstream flow behind the holes. The inlet to the rotary condenser is preferably to be designed in such a way that a certain lead is created at the inlet in order to reduce the work input of the fluid (cf. FIG. 4.

External Apparatus

The external apparatuses formed of the recuperator for the recovery of the thermal energy from the high temperature compressor, which is first absorbed by the coupled rotary cooler. The external cooling medium is preferably ambient air, which is at the same time used as combustion air in the combustion chamber (see FIG. 7). Alternatively, in the case of operation with a low-temperature compressor, an external recuperator is required which integrates the waste heat into the combustion air after the flash tank. The external cooling medium for cooling the low-temperature compressor preferably formed of ambient air, which is fed to the environment as thermal waste. Preheated combustion air is preferably supplied to the combustion chamber in all cases. The working medium is preferably noble gas, which is heated to operating temperature by the waste heat from the combustion chamber.

Recuperator for Utilizing the Waste Heat after Expansion

This recuperator is preferably a corner tube heat exchanger, which has a counterflow circuit. Ambient air is passed through the tubes and the working medium moves around the tubes. This ensures that the working medium is not contaminated by dust.

Waste Heat Exchanger

The waste heat exchanger has a radiation chamber, the walls of which are cooled by the working medium and a convective part, which is designed in the same way as the recuperator. This means that the working medium flows through the tubes and the flue gas flows about the tubes. The flue gas is cooled down almost to the ambient level. An option is to add a condensing unit to save fuel.

Combustion Chamber

The combustion chamber is basically operated with any fuel. It can therefore be equipped with a solid fuel firing system or with burners for fluid fuels. The walls of the combustion chamber are preferably cooled with the available process media or made of refractory material.

System Flow Diagram According to FIG. 7

The system flow diagram shows an example of sliding mode operation. This means that compression takes place at a higher temperature level in order to be able to extract heat for external use (cogeneration). The numerical values for temperatures and pressures given below are introduced as examples and may change considerably depending on application requirements.

Fuel and preheated air are fed to the fictitiously adiabatic combustion chamber, with the flue gas formed there leaving the combustion chamber at approx. 2000° C. In a downstream waste heat exchanger, which is partially structurally connected to the combustion chamber to cool the combustion chamber walls, the flue gas is first cooled to 500° C., then fed to an economizer for heating the working medium of the low-pressure turbine, and at 100° C. the flue gas is fed into the stack.

The heat given off by the flue gas is used to heat the working medium, which enters the waste heat exchanger at 400° C. and exits it at 1500° C. The working medium is preferably xenon. The working medium is under a pressure of 15 bar without taking into account minimal pressure differences that occur as a result of transport. In the flash tank, the working medium is reduced to a pressure of 1 bar, while at the same time the temperature is lowered to 400° C. The flash process is partially or completely isothermal at a working temperature higher than 400° C., but not at temperatures higher than the inlet temperature of the working medium. The level of the working temperature depends on the selected cooling medium and the material of the expansion discs. The output shaft work is transferred to a generator, where conversion to electrical work takes place. Within the expansion stage, the working medium is first reduced to a working temperature, with the dissipated heat being returned to the working medium during the actual expansion. In this way, the temperature remains almost constant during expansion. The final phase of expansion is almost isentropic in order to minimize exegetic losses. The working medium is further cooled in an air preheater at approximately the same pressure to a level of 80 to 200° C., after which it enters the compressor stage. In the compressor, the pressure is raised isothermally to 15 bar, wherein, in the final phase of this process step, the pressure can also be raised isentropically; accordingly, the temperature would rise by a certain amount. The extent to which this is allowed depends on which disc material is used in the compressor and what exegetic loss is acceptable in terms of heat transfer. The compressor discs are cooled by a medium circulating internally in the discs. This medium transfers its heat to a heat transfer medium coming from the environment. The compressed working medium is ultimately fed to the waste heat exchanger, thus closing the circuit of this medium.

The combustion air is fed to the combustion chamber after passing through the air preheater, which it leaves at a temperature of 80 to 180° C. A further cooling flow from an external source—in this case the return flow of a useful heat sink with a temperature of up to 150° C.—is required to conduct the waste heat from the compressor stage into the feed of the useful heat sink. The temperature of this medium increases up to 350° C. in the feed.

Cycle of the Low-Pressure Turbine

The flue gas exits the combustion chamber at a temperature of 500° C. It lends itself to use this temperature level in a second gas turbine, which operates at low pressure. Like the high-pressure turbine, the low-pressure turbine has a flash tank, which operates at 400° C. and 5 bar, and a compressor, which is isothermal and has the parameters 50° C. and 5 bar at the outlet. This flash tank is also equipped with cooled discs like the high-pressure section. The waste heat from the flash tank is used to heat the combustion air from 10° C. to 80° C. in a low-temperature preheater. The ambient air is at 10° C., so that the xenon can (preferably) be cooled down to 20° C. The required cooling flow for the low-pressure compressor comes from the ambient air and has no thermal value. The low-temperature turbine could also be run in sliding mode to extract process heat.

As an alternative to the low-temperature gas turbine, a Rankine process could also be designed. This would have the advantage of generating vapor that could be useful for special process purposes.

Aspects of the overall system according to the plant flow diagram in FIG. 7

1. A gas turbine process is provided having a high-pressure stage and a low-pressure stage, wherein for the flashers and compressors respectively disc structures, which in the case of the high-pressure stage include internally cooled discs, wherein the compressor of the high-pressure stage includes an evaporating medium directly combined with a rotary condenser and the rotary evaporator is cooled by an external medium, and in the high-pressure stage a noble gas is used as a working medium having a low thermal conductivity and a low specific heat capacity, the noble gas being heated by an external heat source.

2. The external heat source is a combustion chamber with cooled or uncooled walls, in which a gaseous, liquid or solid fuel is burned with air as oxygenator and the walls are cooled by the working medium of the high-pressure stage.

3. Downstream of the combustion chamber is an economizer, in which the flue gas from the combustion chamber is further cooled and transfers its heat to the working medium of the low-pressure stage, the working medium preferably being a noble gas with a low heat capacity.

4. Instead of the low-pressure stage formed of a flash tank and compressor, a steam turbine with a feed pump is used, each of which is preferably a disc design, whereby the steam turbine can be multi-stage and recirculation areas in which the vapor is directed to the periphery of the discs are between the individual stages.

5. The outlet openings of the discs located close to the shaft in the last stage of a multistage turbine or a single-stage turbine are offset from one another in such a way that the exiting gas flow is twist-free, such that the offset angle is negative with respect to the direction of rotation of the disc.

6. As an alternative to the previous item 5, the working medium can also be directed outward through longitudinal grooves in the shaft, the grooves being twisted helically against the direction of rotation to cancel the twist at the outlet of the gas.

7. The discs of the high-pressure flash tank are hollow on the inside, so that an evaporating medium can behave in such a way that it evaporates in the outer, hot area and condenses in the inner, cold area, so that the working medium flowing on the outside first evaporates on its way from the outer to the inner edge of the disc without giving off any work and then absorbs heat when work is given off, so that the discharge of work is isothermal, with the inner condensate film flowing back to the outside by centrifugal force, and optionally a certain distance in the near-wave region is uncooled, so that residual isentropic expansion can take place.

8. The discs of the high-pressure compressor are also hollow inside and connected to a rotational heat exchanger, which is formed of discs that are also hollow, by the shaft and by pipes located at the outer edge of the discs, the rotational heat exchanger being cooled by an external working medium flowing about the discs of the rotational heat exchanger outside.

Points of the disc turbine according to the invention as well as the method for operating the Tesla-type turbine according to the invention 1. Tesla-type turbine with at least one disc, preferably a plurality of discs arranged on an axis of rotation, which can be set in rotation with a gas volume flow in a substantially tangential inflow, so that mechanical energy can be collected at a shaft coupled to the disc, wherein the disc or discs have at least one cavity in the disc body forming a respective disc, in which cavity a cooling liquid is received or can be received for the purpose of cooling the disc body, and wherein the Tesla-type turbine further has at least one gas receiving chamber for receiving and discharging an at least partially tangential gas volume flow onto the disc or discs.

2. Tesla-type turbine according to item 1, wherein at least one of the discs is adapted to evaporate coolant received in its cavity when heat is supplied from the circulating gas volume flow in the cavity.

3. Tesla-type turbine according to item 1, wherein at least one of the discs is adapted to heat coolant received in its cavity substantially without evaporation when heat is supplied from the circulating gas volume flow.

4. A method of operating a Tesla-type turbine as defined in item 1, in which a gas volume flow is supplied substantially tangentially to the disc(s), so that frictionally the disc(s) is/are set in rotation.

5. Method of operating a Tesla-type turbine according to item 4, in which heat from the gas volume flow is transferred to the cooling liquid in the cavity of the disc body, so that the cooling liquid at least partially evaporates.

6. Method of operating a Tesla-type turbine according to item 4, in which heat is transferred from the gas volume flow to the cooling liquid in the cavity of the disc body, so that the temperature of the cooling liquid is increased, but the cooling liquid is still substantially in liquid phase.

Points of the apparatus for converting thermal energy into mechanical energy according to the invention and of the method for converting thermal energy into mechanical energy 7. Apparatus for converting thermal energy into mechanical energy, comprising a Tesla-type turbine according to at least one of items 1-3, wherein the disc(s) is/are arranged coaxially on a shaft, and wherein the shaft is mechanically connected to a compressor unit having one or more compressor discs, which is/are connected to the shaft in a rotationally fixed manner, such that upon rotation of the Tesla-type turbine the compressor disc(s) is/are set in rotation, and wherein the compressor unit comprises a compressor gas receiving chamber fluidly connected to the gas receiving chamber of the Tesla-type turbine, so that gas compressed by the compressor unit can be supplied to the Tesla-type turbine.

8. Apparatus for converting thermal energy into mechanical energy according to item 7, the compressor disc or compressor discs likewise having a cavity in the respective disc body, the cavity of the disc of the Tesla-type turbine being fluidically connected to the cavity of the compressor disc, so that coolant present in the gaseous phase can be fed from the cavity of the disc to the cavity of the compressor disc.

9. Apparatus for converting thermal energy into mechanical energy according to one of items 7 and 8, the compressor disc or discs being connected to a rotatable cooling unit in a rotationally fixed manner, the cooling unit likewise having one or more cooling discs, which is/are arranged coaxially on a cooler shaft connected to the shaft of the Tesla-type turbine in a rotationally fixed manner, the cooling disc likewise having a cavity in its disc body for receiving cooling liquid, and the cooling disc or discs being fluidically connected to the compressor disc or discs, so that cooling liquid heated in the compressor unit can be returned to the cooling unit, where the cooling liquid can be cooled in the disc or discs of the cooling unit and can be returned from the latter to the disc or discs of the compressor unit.

10. Apparatus for converting thermal energy into mechanical energy according to item 9, wherein a first fluidic connection between the compressor disc or discs and the cooling disc or discs is realized by means of at least one transverse web between the discs through which fluid can flow, and which is arranged substantially axially parallel to the axis of rotation of the shaft.

11. Apparatus for converting thermal energy into mechanical energy according to one of items 9 and 10, in that a second fluidic connection between the compressor disc or discs and the cooling disc or discs is realized by a cavity in a shaft section, which extends from a shaft section covered by the compressor disc or compressor discs to a shaft section covered by the cooling disc or cooling discs, the shaft embodied here or shaft section in question having axially at least one opening in each case to permit flow from the disc in question into the cavity of the shaft or in the reverse direction.

12. Apparatus for converting thermal energy into mechanical energy according to item 11, wherein a propeller is arranged in a stationary manner in the cavity of the shaft section, so that a substantially axial flow movement of the cooling fluid in the shaft can be realized upon relative rotational movement of the shaft about the propeller.

13. Method for converting thermal energy into mechanical energy, in which, in an apparatus for converting thermal energy into mechanical energy according to any of items 7 to 12, the method for operating a Tesla-type turbine according to any of items 4-6 is carried out and, in the process, cooling liquid heated in the compressor disc or compressor discs is fed to the cooling disc or cooling discs and is cooled there, and, after cooling, is returned to the compressor disc or compressor discs.

14. Method for converting thermal energy into electrical energy, in which the method for converting thermal energy into mechanical energy according to item 13 is carried out and kinetic energy of the rotating shaft is converted into electrical energy by means of a generator.

The effect of the Tesla-type turbine according to the invention is that, due to the cooling of the disc, the latter is subjected to a relatively low thermal load, so that a variety of materials can be used to form the respective disc body, including materials that have a low density and consequently a low weight. In particular, discs made of materials with very low density can be rotated at a very high speed due to their resulting low mass torque of inertia, so that the turbine can be operated at high speed and consequently with high efficiency.

The effect of the apparatus for converting thermal energy into mechanical energy according to the invention includes, in particular the fact that, due to the high efficiency of the integrated Tesla-type turbine, also the entire apparatus can be operated with a high efficiency, so that a relatively low thermal or chemical energy input is necessary in order to provide mechanical or electrical energy of the desired quantity.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A Tesla-type turbine for converting an enthalpy of a gas volume flow into mechanical energy, the Tesla-type turbine comprising:
    at least one disc arranged on an axis of rotation and adapted to be set in rotation with the gas volume flow flowing substantially tangentially so that mechanical energy is collectable from a shaft coupled to the at least one disc;
    a disc body that forms the at least one disc and has at least one cavity in which, for the purpose of cooling the disc body, a cooling medium is receivable; and
    at least one gas receiving chamber to receive and discharge the gas volume flow flowing substantially tangentially relative to the at least one disc,
    wherein the at least one cavity of the at least one disc of the Tesla-type turbine is fluidically connected to at least one cavity in a disc body of at least one compressor disc of a compressor unit so that cooling medium present at least partially in the gaseous phase is adapted to be supplied from the at least one cavity of the at least one disc of the Tesla-type turbine to the at least one cavity of the at least one compressor disc.

2. The Tesla-type turbine according to claim 1, wherein the at least one disc is adapted to at least partially evaporate the cooling medium received in the at least one cavity when heat is supplied from the gas volume flow to the at least one cavity.

3. A method for operating the Tesla-type turbine according to claim 1, the method comprising: supplying the gas volume flow to the at least one disc in a substantially tangentially flowing direction relative to the at least one disc, so that the at least one disc is set into rotation due to friction.

4. The method according to claim 3, wherein heat of the gas volume flow is transferred to the cooling medium in the at least one cavity of the disc body so that the cooling medium at least partially evaporates.

5. The Tesla-type turbine according to claim 1, wherein the cooling medium is a cooling liquid.

6. An apparatus for converting thermal energy into mechanical energy, the apparatus comprising:
    a shaft;
    a Tesla-type turbine having:
        at least one disc arranged on an axis of rotation, the at least one disc adapted to be set in rotation with a gas volume flow flowing substantially tangentially so that mechanical energy is collectable from the shaft coupled to the at least one disc,
        a disc body that forms the at least one disc and has at least one cavity in which, for the purpose of cooling the disc body, a cooling medium is receivable, and
        at least one gas receiving chamber to receive and discharge the gas volume flow flowing substantially tangentially relative to the at least one disc,
    wherein the at least one disc of the Tesla-type turbine is arranged coaxially on the shaft,
    wherein the shaft is mechanically connected to a compressor unit, which has at least one compressor disc connected to the shaft in a rotationally fixed manner, so that, upon rotation of the Tesla-type turbine, the at least one compressor disc is set in rotation,
    wherein the compressor unit comprises a compressor gas receiving chamber that is fluidically connected to the at least one gas receiving chamber of the Tesla-type turbine so that gas compressed by the compressor unit is supplied to the Tesla-type turbine or to the at least one gas receiving chamber of the Tesla-type turbine, and
    wherein the at least one compressor disc has at least one cavity in a disc body forming the at least one compressor disc, the at least one cavity of the at least one disc of the Tesla-type turbine being fluidically connected to the at least one cavity of the at least one compressor disc so that cooling medium present at least partially in the gaseous phase is adapted to be supplied from the at least one cavity of the at least one disc of the Tesla-type turbine to the at least one cavity of the at least one compressor disc.

7. The apparatus according to claim 6, wherein the at least one compressor disc is connected to a rotatable cooling unit in a rotationally fixed manner, wherein the cooling unit has at least one cooling disc that is arranged coaxially on a cooler shaft, which is connected to the shaft of the Tesla-type turbine in a rotationally fixed manner, and wherein the at least one cooling disc has at least one cavity in a disc body forming the at least one cooling disc and the at least one cavity of the at least one cooling disc is fluidically connected to the at least one cavity of the at least one compressor disc so that the cooling medium heated in the compressor unit is fed to the cooling unit, by means of which the cooling medium is cooled in the at least one cooling disc of the cooling unit and is returned from the at least one cooling disc to the at least one compressor disc of the compressor unit.

8. The apparatus according to claim 7, wherein at least a first fluidic connection between the at least one cavity of the at least one compressor disc and the at least one cavity of the at least one cooling disc is formed by at least one transverse web that is adapted to be flowed through and is arranged substantially axially parallel to the axis of rotation of the shaft between the at least one compressor disc and the at least one cooling disc.

9. The apparatus according to claim 8, wherein at least a second fluidic connection between the at least one cavity of the at least one compressor disc and the at least one cavity of the at least one cooling disc is formed by a hollow connecting space of the shaft, which extends from a shaft section covered by the at least one compressor disc to a shaft section covered by the at least one cooling disc, the covered shaft sections each having axially at least one opening for realizing a flow of the cooling medium into and out of the hollow connecting space of the shaft into and out of the at least one cavity of the at least one compressor disc and/or into and out of the at least one cavity of the at least one cooling disc.

10. A method for operating the apparatus for converting thermal energy into mechanical energy according to claim 7, the method comprisinq:
    feeding heated cooling medium in the at least one compressor disc or the at least one cavity of the at least one compressor disc to the at least one cooling disc or the at least one cavity of the at least one cooling disc;
    cooling the heated cooling medium; and
    feeding the cooling medium, after the cooling of the cooling medium, back to the at least one compressor disc.

11. The method according to claim 10, further comprising converting the kinetic energy of the rotating shaft into electrical energy via a generator.

\* \* \* \* \*